United States Patent
Iwamoto

(10) Patent No.: US 10,416,421 B2
(45) Date of Patent: Sep. 17, 2019

(54) ZOOM LENS AND IMAGE PICKUP APPARATUS INCLUDING THE SAME

(71) Applicant: CANON KABUSHIKI KAISHA, Tokyo (JP)

(72) Inventor: Shunji Iwamoto, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 26 days.

(21) Appl. No.: 15/941,733

(22) Filed: Mar. 30, 2018

(65) Prior Publication Data

US 2018/0284406 A1    Oct. 4, 2018

(30) Foreign Application Priority Data

Mar. 31, 2017  (JP) .................. 2017-070480

(51) Int. Cl.
| | |
|---|---|
| *G02B 15/16* | (2006.01) |
| *G02B 13/02* | (2006.01) |
| *G02B 13/00* | (2006.01) |
| *G02B 15/173* | (2006.01) |

(52) U.S. Cl.
CPC ......... *G02B 15/16* (2013.01); *G02B 13/0045* (2013.01); *G02B 13/02* (2013.01); *G02B 15/173* (2013.01)

(58) Field of Classification Search
CPC .... G02B 15/16; G02B 13/0045; G02B 13/02; G02B 13/173

USPC ......................................... 359/686
See application file for complete search history.

(56) References Cited

U.S. PATENT DOCUMENTS

| | | |
|---|---|---|
| 7,068,429 B1 | 6/2006 | Ori |
| 9,217,851 B2 | 12/2015 | Iwamoto |
| 2009/0195885 A1 | 8/2009 | Yamanaka et al. |
| 2013/0033621 A1 | 2/2013 | Maruyama |
| 2014/0055659 A1 | 2/2014 | Iwamoto |
| 2017/0199356 A1 | 7/2017 | Iwamoto |
| 2017/0276917 A1 | 9/2017 | Iwamoto |
| 2018/0024314 A1* | 1/2018 | Tashiro ............. G02B 15/167 359/684 |

* cited by examiner

*Primary Examiner* — Evan P Dzierzynski
*Assistant Examiner* — Mitchell T Oestreich
(74) *Attorney, Agent, or Firm* — Carter, DeLuca & Farrell LLP

(57) ABSTRACT

Provided is a zoom lens, including, in order from an object side: a positive first lens unit; a negative second lens unit; an intermediate lens unit including at least one lens unit; a positive (N−1)-th lens unit; and a negative N-th lens unit, in which the (N−1)-th lens unit is configured to move for focusing, and in which a focal length fLM of the intermediate lens unit at a wide angle end, a focal length f(N−1) of the (N−1)-th lens unit, which consists of a single lens element, a focal length fN of the N-th lens unit, a distance DN on an optical axis from a lens surface closest to the object side of the N-th lens unit to a lens surface closest to the image side of the N-th lens unit, and a back focus BFw at the wide angle end are each appropriately set.

13 Claims, 22 Drawing Sheets

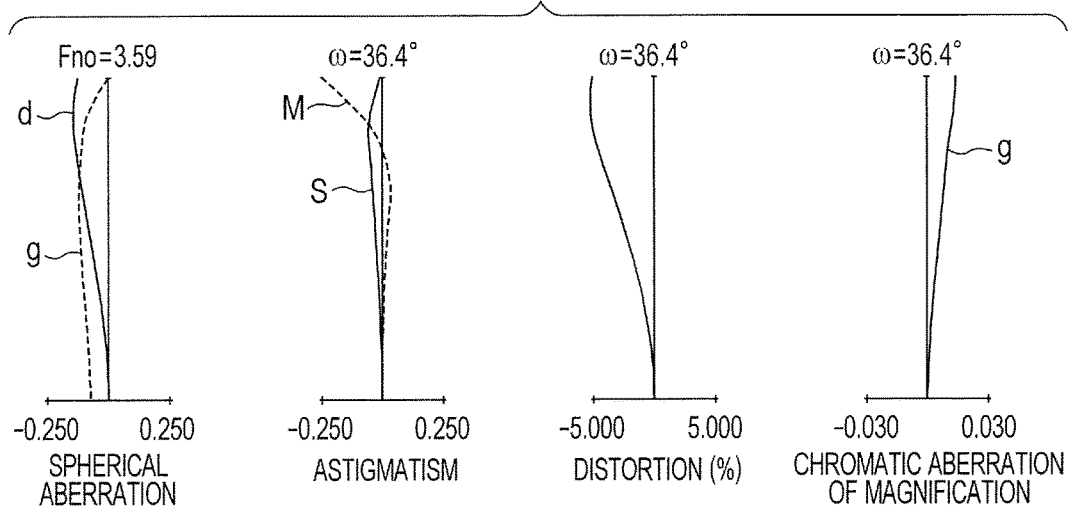
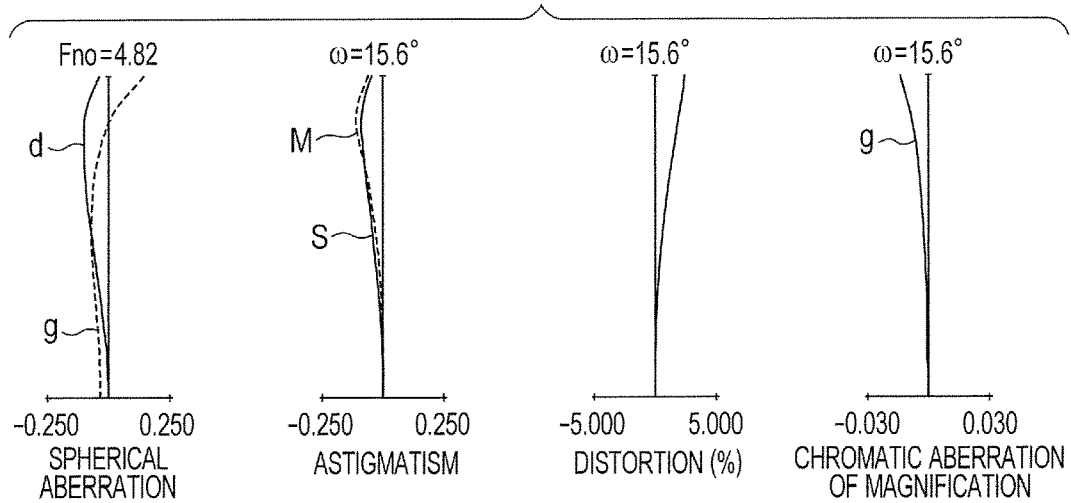
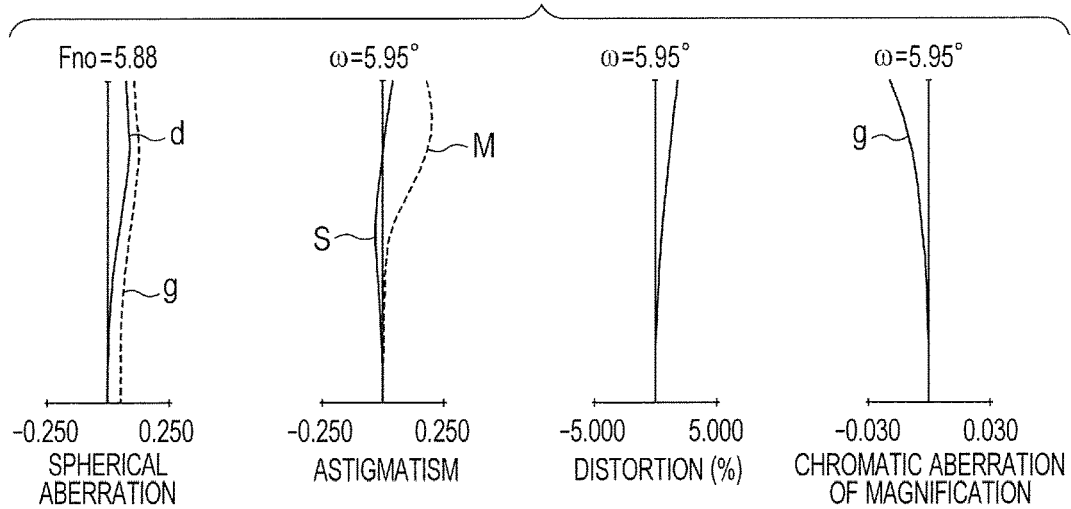

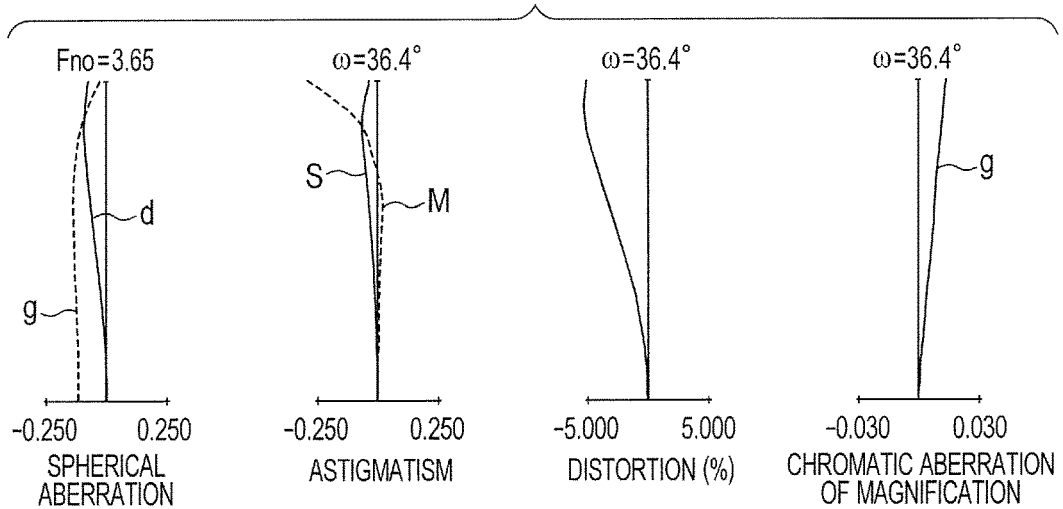
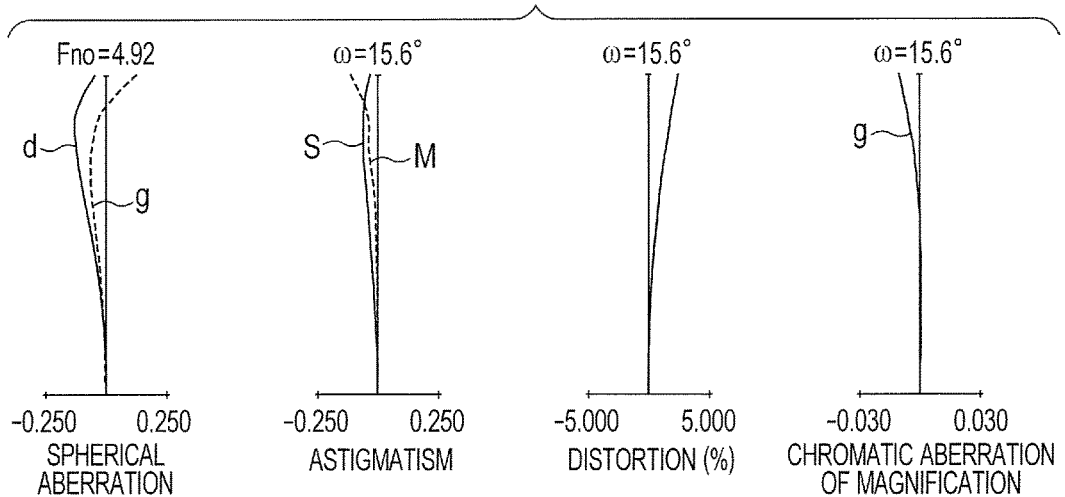
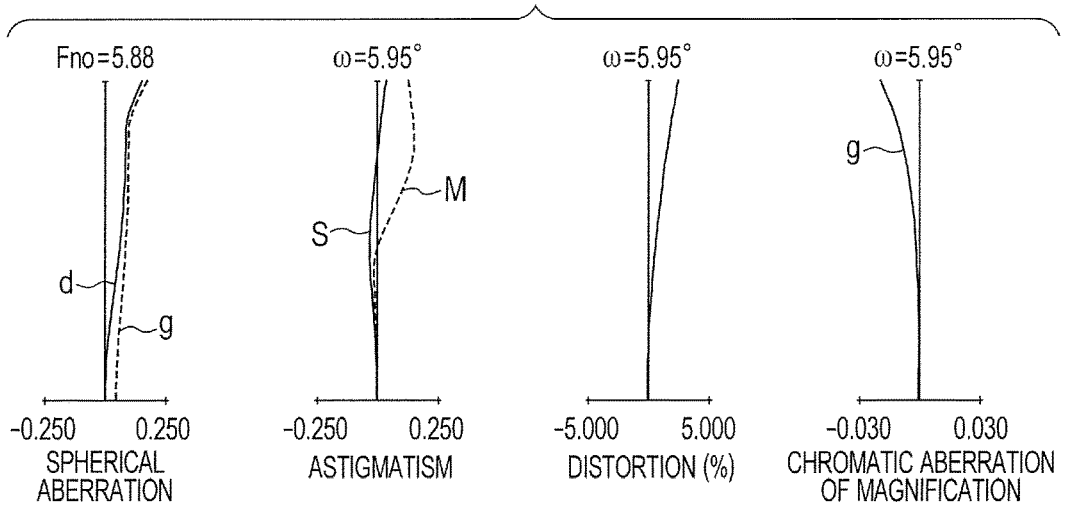

ZOOM LENS AND IMAGE PICKUP APPARATUS INCLUDING THE SAME

BACKGROUND OF THE INVENTION

Field of the Invention

The present invention relates to a zoom lens and an image pickup apparatus including the zoom lens, which are suitable for an image pickup apparatus using a solid-state image pickup element, for example, a video camera, an electronic still camera, a broadcasting camera, or a monitoring camera.

Description of the Related Art

In recent years, an image pickup optical system for use in a digital single-lens reflex camera system serving as an image pickup apparatus is required to be a compact zoom lens having a high zoom ratio (high magnification ratio) and high optical performance over the entire zoom range. The image pickup optical system is further required to have a focusing function capable of quickly performing an automatic focusing operation (autofocus).

Meanwhile, there is also a demand for execution of not only still image photography but also moving image photography. In the moving image photography, a focusing operation, which is executed during the still image photography, is required to be performed repeatedly. As a method of the focusing operation at this time, it is a common practice to use a high frequency detection method (TV-AF method) involving driving a lens unit for focusing (focus lens unit) to reciprocate at high speed in an optical axis direction (hereinafter referred to as "wobbling") to detect a direction of shift from an in-focus state.

In this method, during the wobbling, signal components in a particular frequency band of an image region are detected from output signals, which are obtained by an image pickup sensor, to calculate an optimum position of the focus lens unit in the optical axis direction at which the in-focus state is achieved.

After that, the focus lens unit is moved to the calculated optimum position, and thus the focusing is completed. In the focusing operation during the moving image photography, in order not to make a user feel a sense of discomfort, for example, flickering, the focus lens unit is required to be driven at high speed during wobbling. When the focusing operation is performed by the wobbling, and a weight of the focus lens unit is heavy, a motor or an actuator for driving the focus lens unit at high speed is increased in size.

Further, in order to prevent a drive sound output from a drive device, for example, a motor, from being recorded, the focus lens unit is required to be driven as quietly as possible. Therefore, the focus lens unit is strongly desired to be compact and lightweight in order to reduce a load to the drive device, for example, the motor, as much as possible. There has been known a zoom lens configured to perform focusing with use of a compact and lightweight lens unit corresponding to a part of lens units forming the zoom lens (U.S. Patent Application Publication No. 2013/0033621, U.S. Pat. No. 7,068,429, and U.S. Patent Application Publication No. 2009/0195885).

In U.S. Patent Application Publication No. 2013/0033621, there is disclosed a zoom lens including, in order from an object side to an image side, first to fifth lens units having positive, negative, positive, positive, and negative refractive powers. In the zoom lens, the fourth lens unit is used to perform focusing. In U.S. Pat. No. 7,068,429, there is disclosed a zoom lens including, in order from an object side to an image side, first to fifth lens units having positive, negative, positive, positive, and positive refractive powers. In the zoom lens, the fourth lens unit is used to perform focusing. In U.S. Patent Application Publication No. 2009/0195885, there is disclosed a zoom lens including, in order from an object side to an image side, first to fifth lens units having positive, negative, positive, positive, and negative refractive powers. In the zoom lens, the fifth lens unit is used to perform focusing.

In a zoom lens, in order to perform high-speed focusing with a compact and lightweight lens unit while achieving a high zoom ratio and downsizing of the entire lens system, it is important to appropriately set a zoom type, refractive powers of respective lens units, a lens configuration, and other such factors.

SUMMARY OF THE INVENTION

The present invention has an object to provide a zoom lens, which has a high zoom ratio and high optical performance over the entire zoom region and the entire object distance, and is capable of easily performing focusing at high speed.

According to one embodiment of the present invention, there is provided a zoom lens, including, in order from an object side to an image side:

a first lens unit having a positive refractive power;
a second lens unit having a negative refractive power;
an intermediate lens unit including at least one lens unit;
an (N−1)-th lens unit having a positive refractive power; and
an N-th lens unit having a negative refractive power,
the first lens unit, the second lens unit, the intermediate lens unit, the (N−1)-th lens unit, and the N-th lens unit having an interval between each pair of adjacent lens units, which is changed during zooming,
in which the (N−1)-th lens unit is configured to move for focusing,
in which the (N−1)-th lens unit consists of a single lens element, and
in which the zoom lens satisfies the following conditional expressions:

$$0.4 < (fN/fLM) \times (fN/f(N-1)) < 1.1; \text{ and}$$

$$0.759 < DN/BFw < 1.896,$$

where fLM represents a focal length of the intermediate lens unit at a wide angle end, f(N−1) represents a focal length of the (N−1)-th lens unit, fN represents a focal length of the N-th lens unit, DN represents a distance on an optical axis from a lens surface closest to the object side of the N-th lens unit to a lens surface closest to the image side of the N-th lens unit, and BFw represents a back focus at the wide angle end.

Further features of the present invention will become apparent from the following description of exemplary embodiments with reference to the attached drawings.

BRIEF DESCRIPTION OF THE DRAWINGS

FIG. 5A is an aberration diagram of Embodiment 2 at the wide angle end when focused at infinity.

FIG. 5B is an aberration diagram of Embodiment 2 at an intermediate zoom position when focused at infinity.

FIG. 5C is an aberration diagram of Embodiment 2 at a telephoto end when focused at infinity.

FIG. 17A is an aberration diagram of Embodiment 6 at the wide angle end when focused at infinity.

FIG. 17B is an aberration diagram of Embodiment 6 at an intermediate zoom position when focused at infinity.

FIG. 17C is an aberration diagram of Embodiment 6 at a telephoto end when focused at infinity.

DESCRIPTION OF THE EMBODIMENTS

Now, a zoom lens and an image pickup apparatus including the zoom lens of each of Embodiments are described. The zoom lens of each of Embodiments includes, in order from an object side to an image side, a first lens unit having a positive refractive power, a second lens unit having a negative refractive power, an intermediate lens unit including at least one lens unit, an (N−1)-th lens unit having a positive refractive power, and an N-th lens unit having a negative refractive power. An interval between each pair of adjacent lens units is changed during zooming. The (N−1)-th lens unit is configured to move for focusing. The (N−1)-th lens unit consists of a single lens element. N is an integer of 5 or more.

Figure 1:
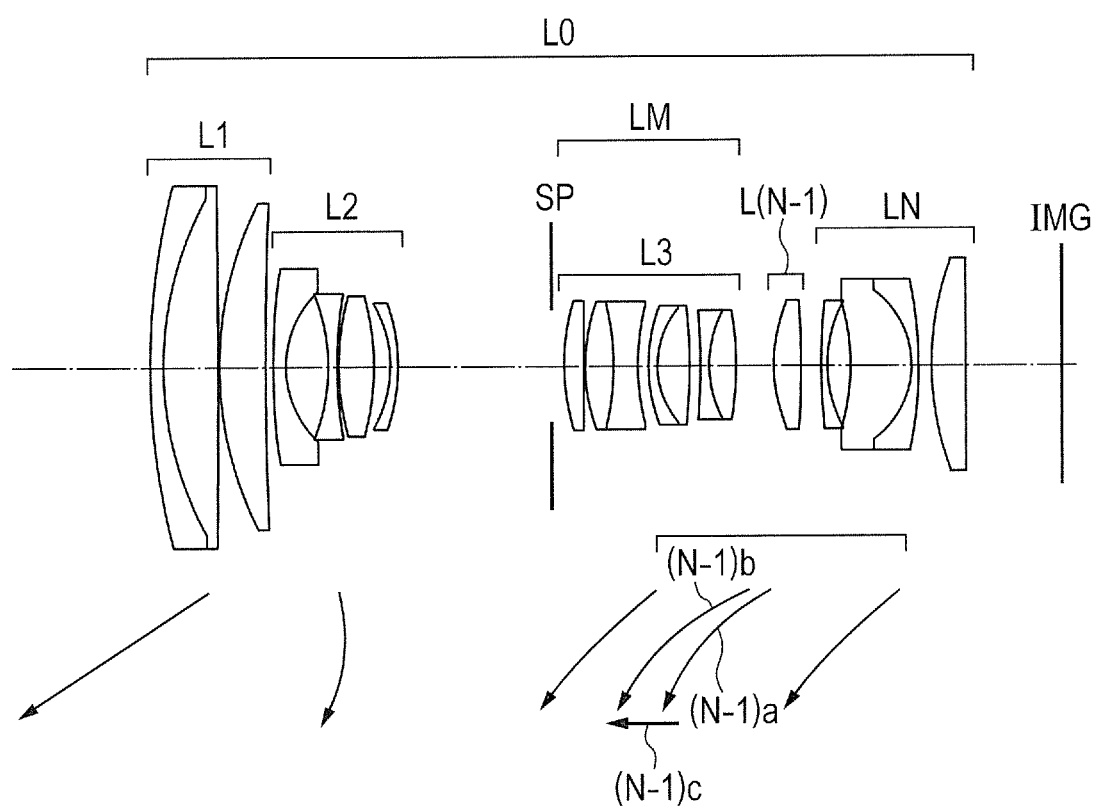
FIG. 1 is a cross-sectional view of a zoom lens of Embodiment 1 at a wide angle end.
Figure 2A:
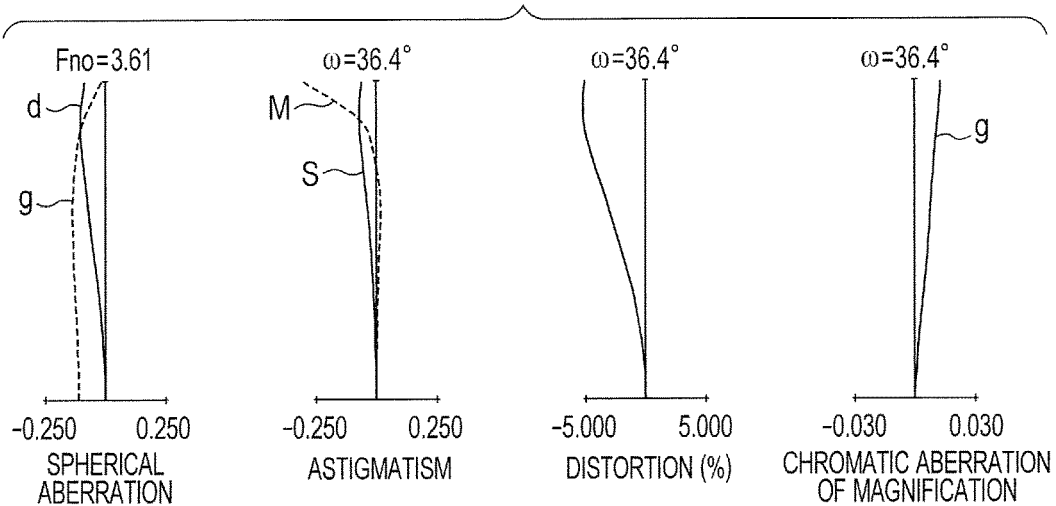
FIG. 2A is an aberration diagram of Embodiment 1 at the wide angle end when focused at infinity.
Figure 2B:
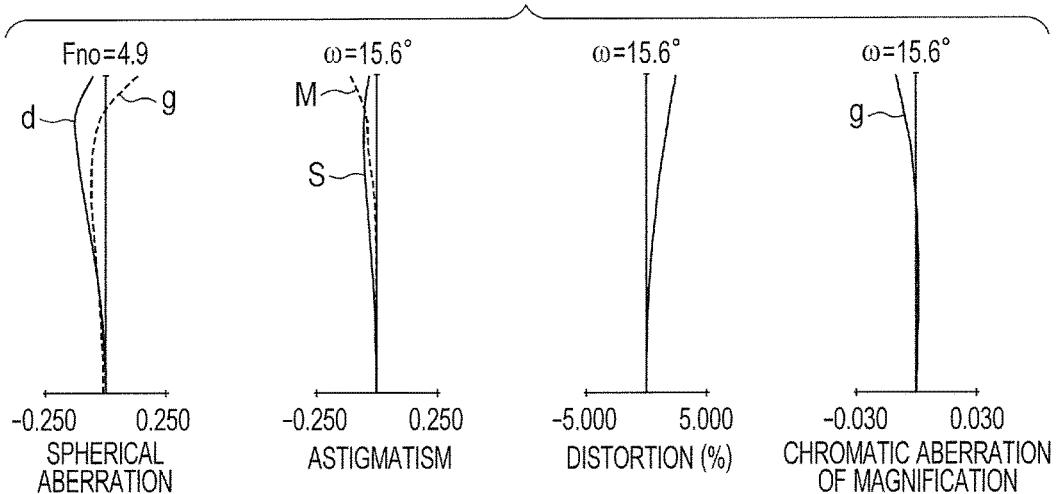
FIG. 2B is an aberration diagram of Embodiment 1 at an intermediate zoom position when focused at infinity.
Figure 2C:
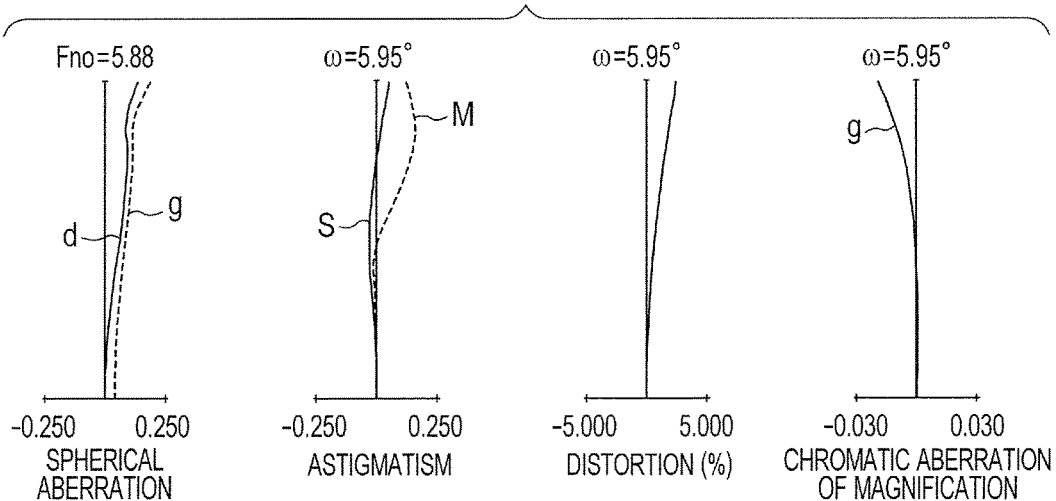
FIG. 2C is an aberration diagram of Embodiment 1 at a telephoto end when focused at infinity.
Figure 3A:
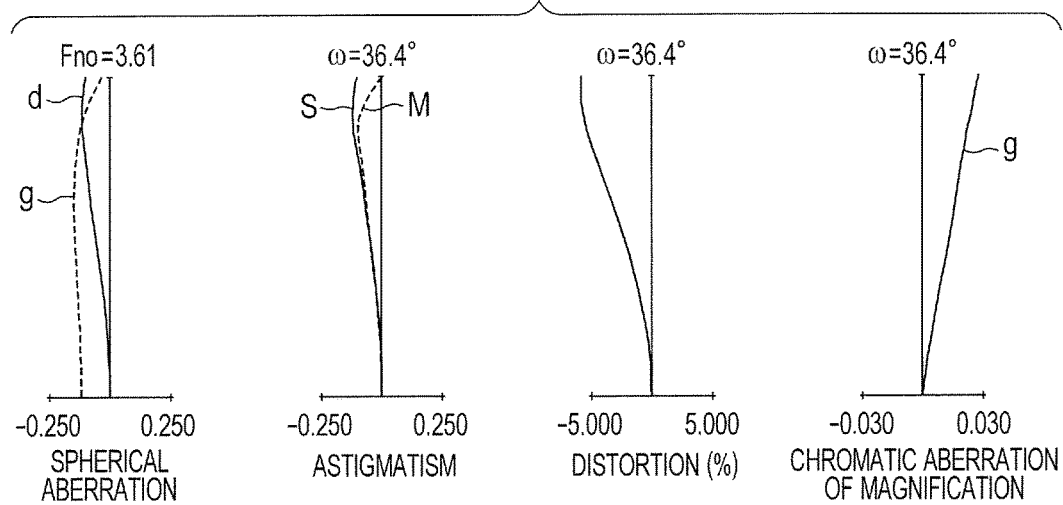
FIG. 3A is an aberration diagram of Embodiment 1 at the wide angle end when an imaging lateral magnification is −0.05.
Figure 3B:
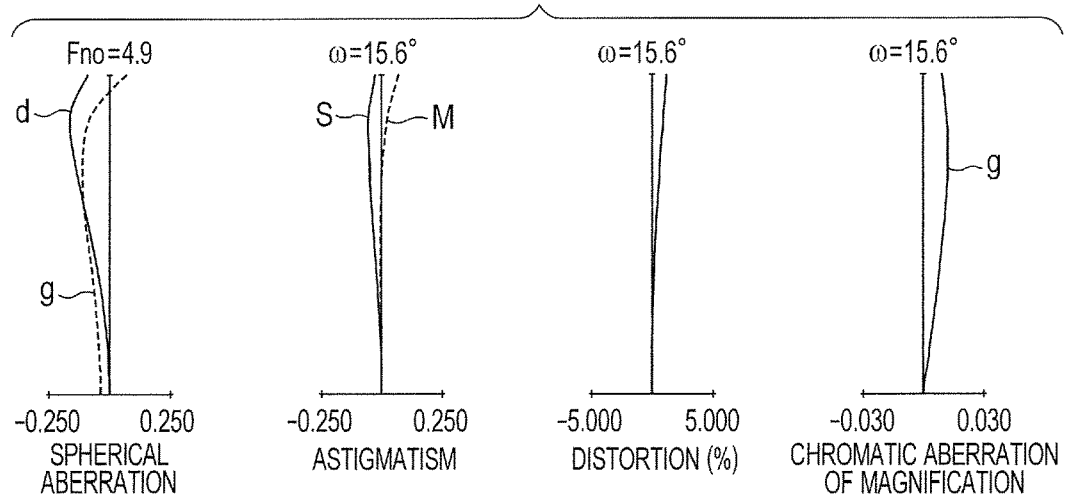
FIG. 3B is an aberration diagram of Embodiment 1 at the intermediate zoom position when the imaging lateral magnification is −0.10.
Figure 3C:
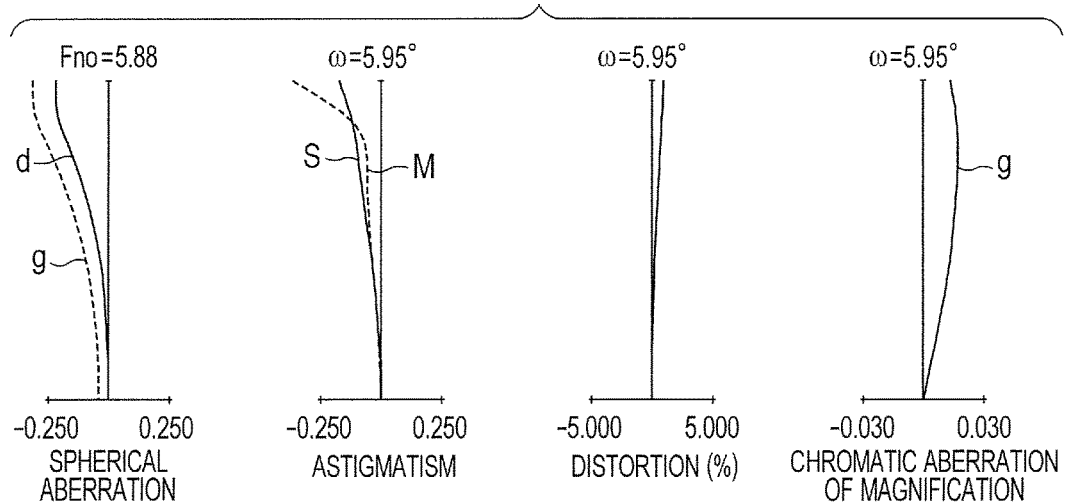
FIG. 3C is an aberration diagram of Embodiment 1 at the telephoto end when the imaging lateral magnification is −0.20.

FIG. 1 is a cross-sectional view of a zoom lens of Embodiment 1 at a wide angle end (short focal length end) of the zoom lens when the focus is on an object at infinity. FIG. 2A, FIG. 2B, and FIG. 2C are longitudinal aberration diagrams of the zoom lens of Embodiment 1 at the wide angle end, at an intermediate zoom position, and at a telephoto end (long focal length end), respectively, when the focus is on the object at infinity. FIG. 3A, FIG. 3B, and FIG. 3C are aberration diagrams of the zoom lens of Embodiment 1 at the wide angle end when an imaging lateral magnification is −0.05, at the intermediate zoom position when the imaging lateral magnification is −0.10, and at the telephoto end when the imaging lateral magnification is −0.20, respectively. Embodiment 1 represents a zoom lens having a zoom ratio of 7.07 and an F-number of from 3.61 to 5.88.

Figure 4:
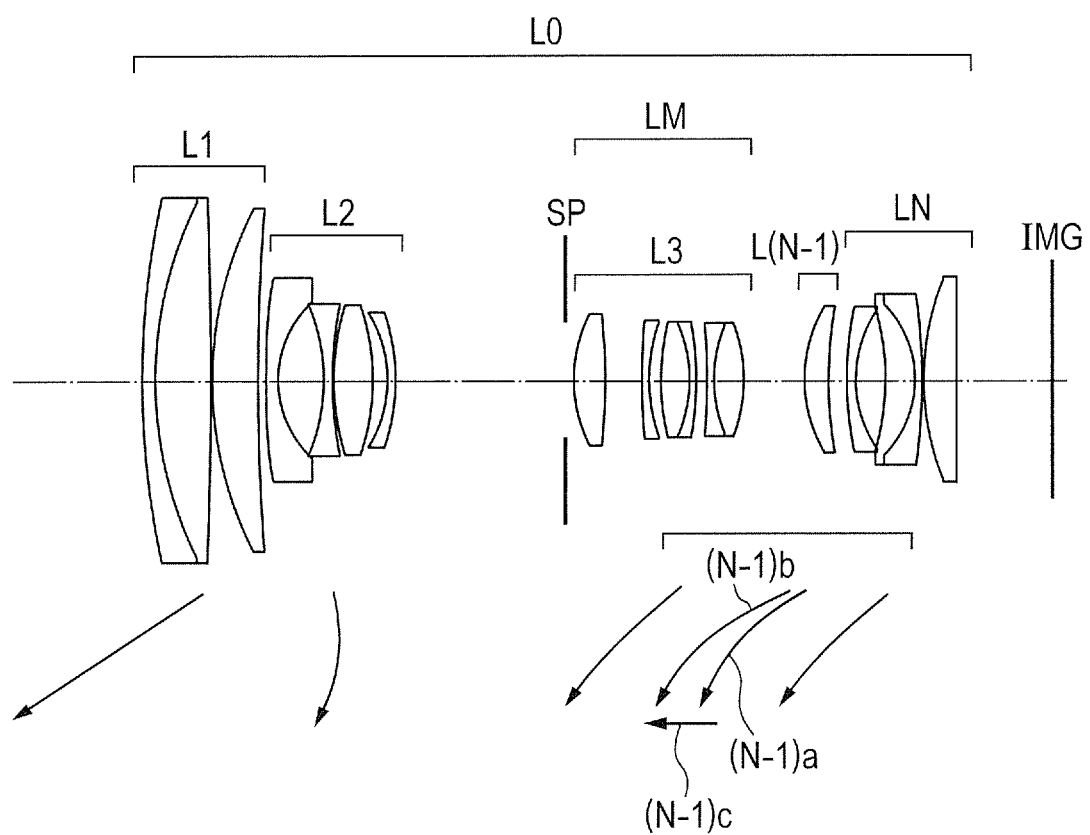
FIG. 4 is a cross-sectional view of a zoom lens of Embodiment 2 at a wide angle end.
Figure 6A:
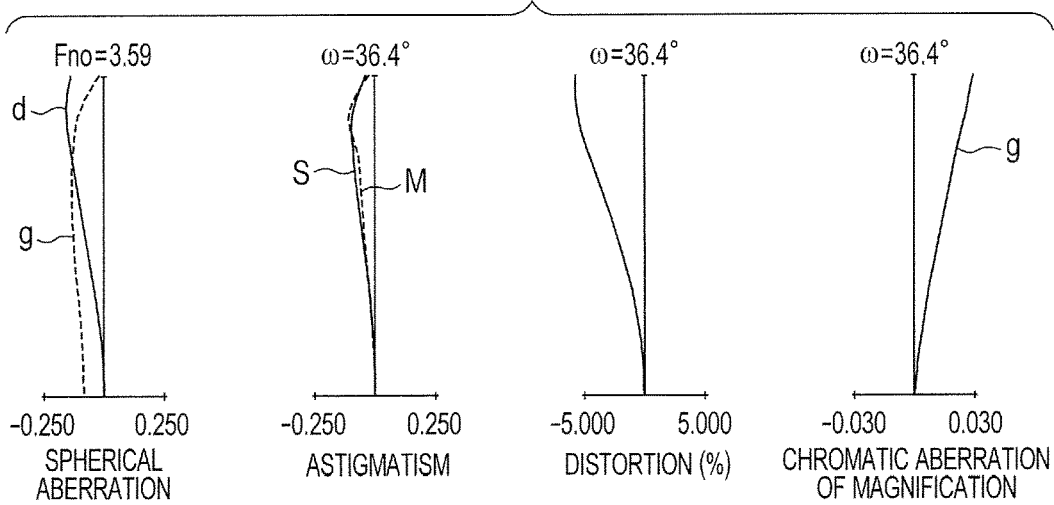
FIG. 6A is an aberration diagram of Embodiment 2 at the wide angle end when an imaging lateral magnification is −0.05.
Figure 6B:
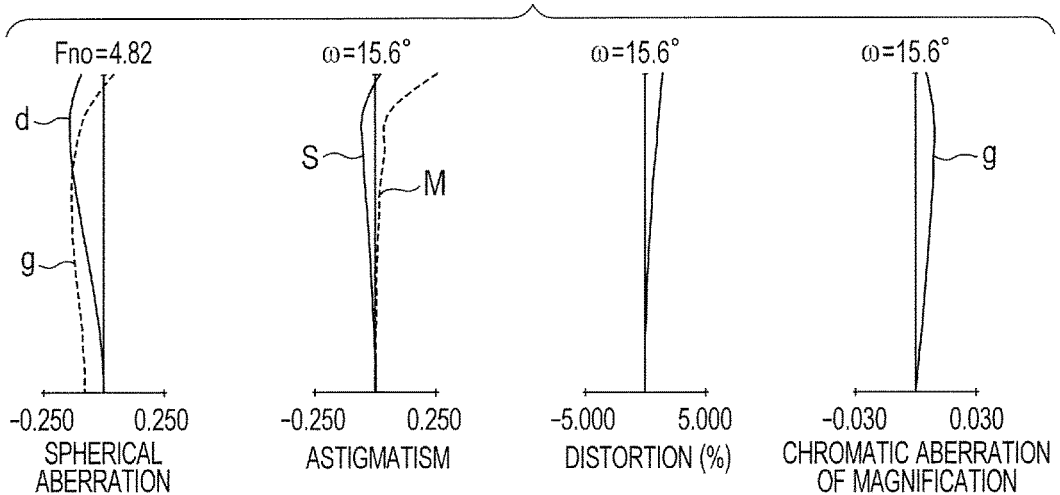
FIG. 6B is an aberration diagram of Embodiment 2 at the intermediate zoom position when the imaging lateral magnification is −0.10.
Figure 6C:
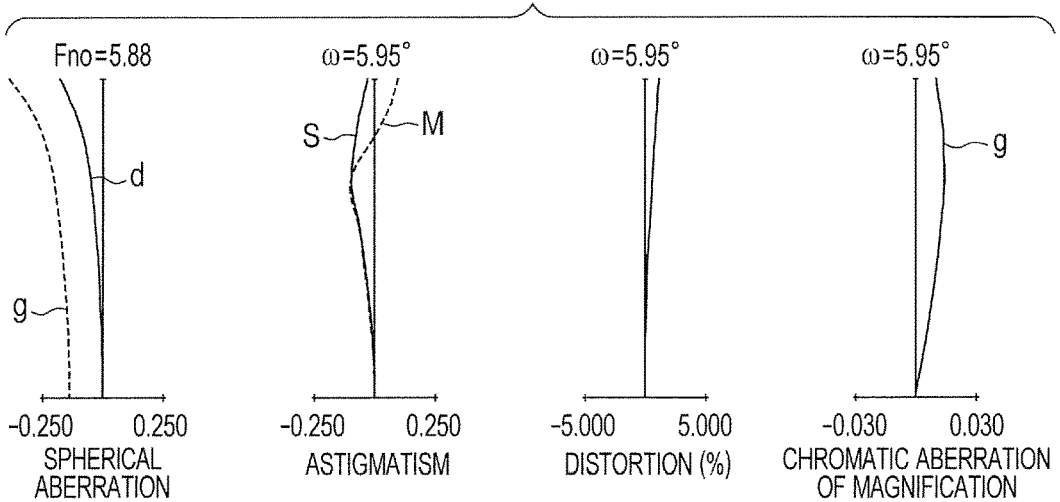
FIG. 6C is an aberration diagram of Embodiment 2 at the telephoto end when the imaging lateral magnification is −0.20.

FIG. 4 is a cross-sectional view of a zoom lens of Embodiment 2 at a wide angle end of the zoom lens when the focus is on an object at infinity. FIG. 5A, FIG. 5B, and FIG. 5C are longitudinal aberration diagrams of the zoom lens of Embodiment 2 at the wide angle end, at an intermediate zoom position, and at a telephoto end, respectively, when the focus is on the object at infinity. FIG. 6A, FIG. 6B, and FIG. 6C are aberration diagrams of the zoom lens of Embodiment 2 at the wide angle end when an imaging lateral magnification is −0.05, at the intermediate zoom position when the imaging lateral magnification is −0.10, and at the telephoto end when the imaging lateral magnification is −0.20, respectively. Embodiment 2 represents a zoom lens having a zoom ratio of 7.08 and an F-number of from 3.59 to 5.88.

Figure 7:
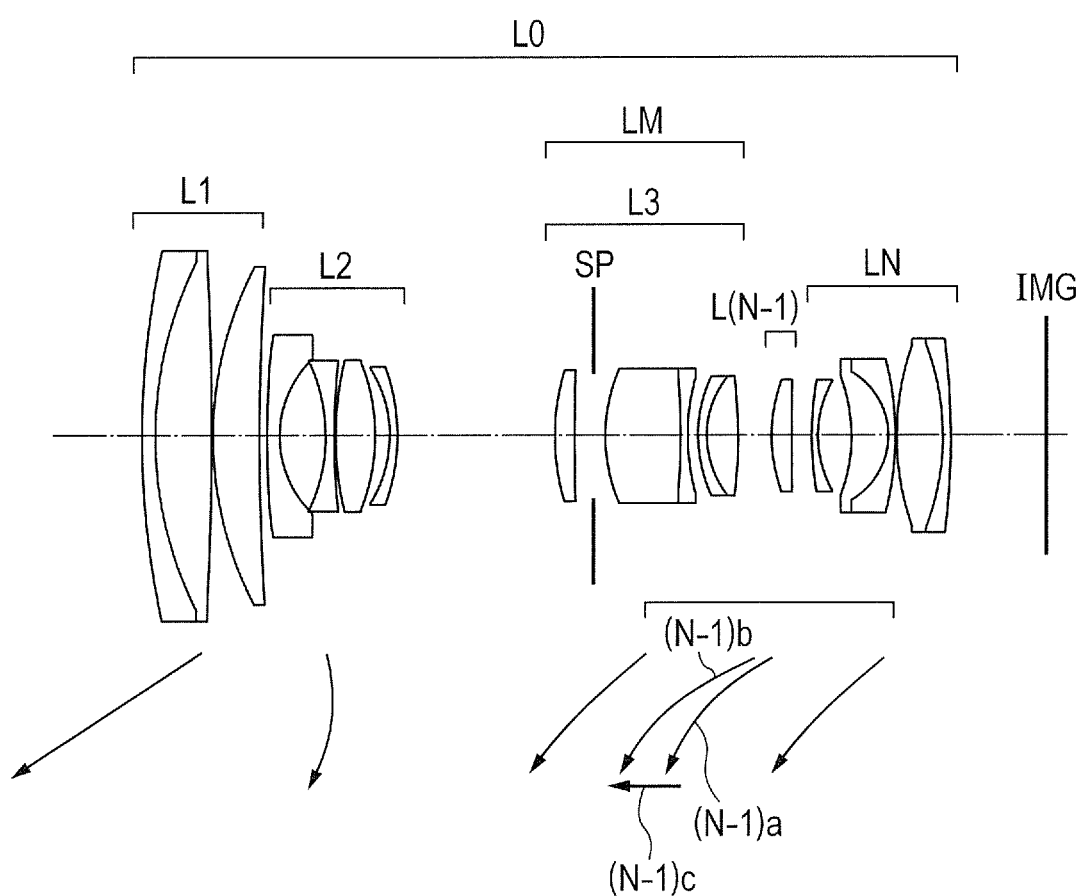
FIG. 7 is a cross-sectional view of a zoom lens of Embodiment 3 at a wide angle end.
Figure 8A:
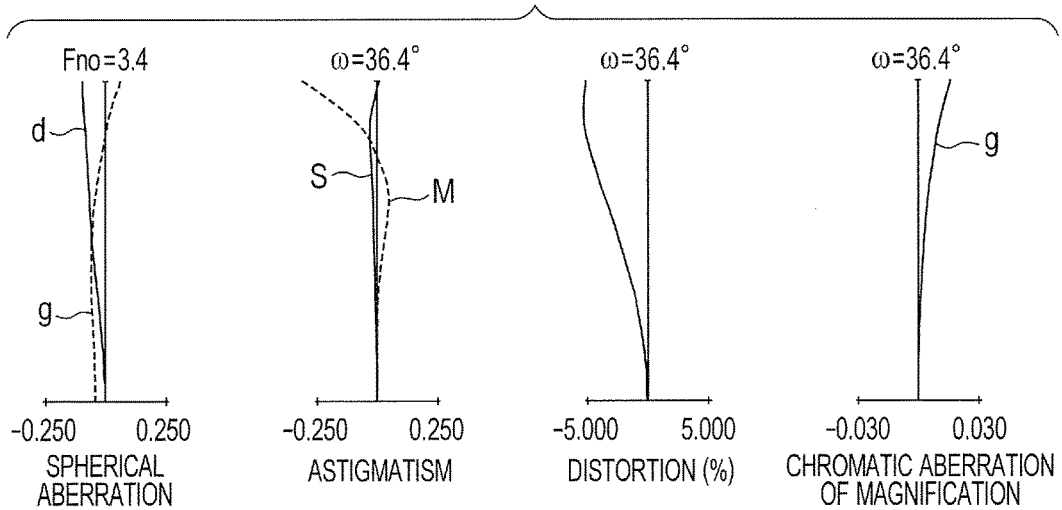
FIG. 8A is an aberration diagram of Embodiment 3 at the wide angle end when focused at infinity.
Figure 8B:
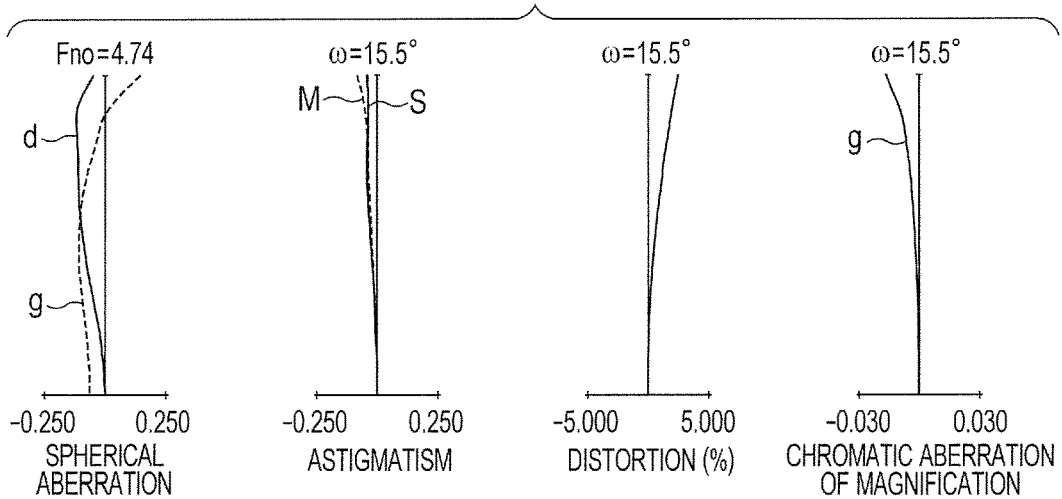
FIG. 8B is an aberration diagram of Embodiment 3 at an intermediate zoom position when focused at infinity.
Figure 8C:
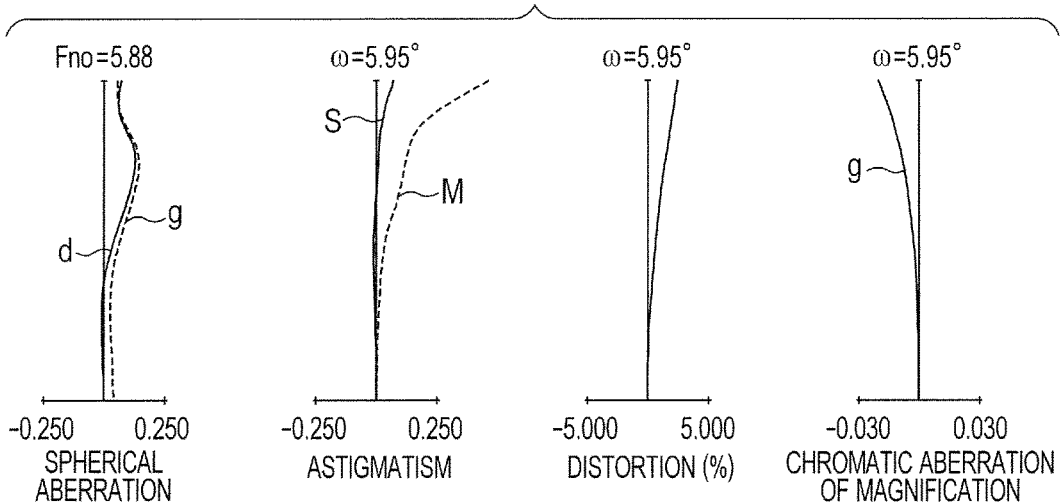
FIG. 8C is an aberration diagram of Embodiment 3 at a telephoto end when focused at infinity.
Figure 9A:
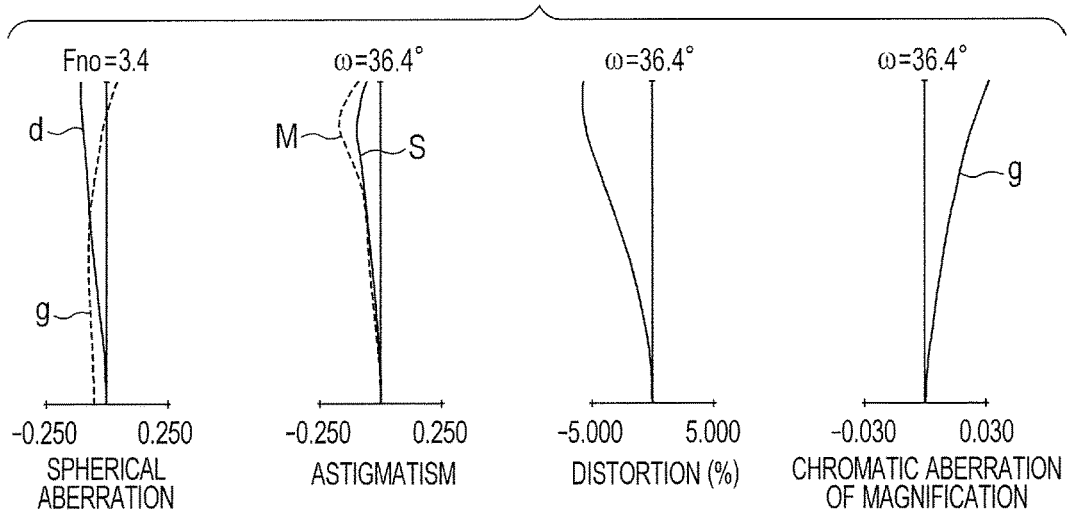
FIG. 9A is an aberration diagram of Embodiment 3 at the wide angle end when an imaging lateral magnification is −0.05.
Figure 9B:
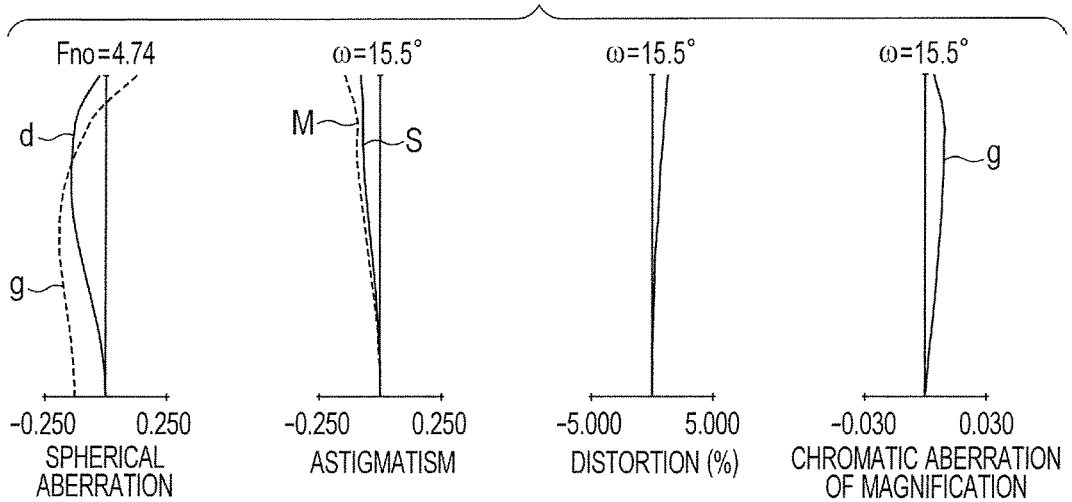
FIG. 9B is an aberration diagram of Embodiment 3 at the intermediate zoom position when the imaging lateral magnification is −0.10.
Figure 9C:
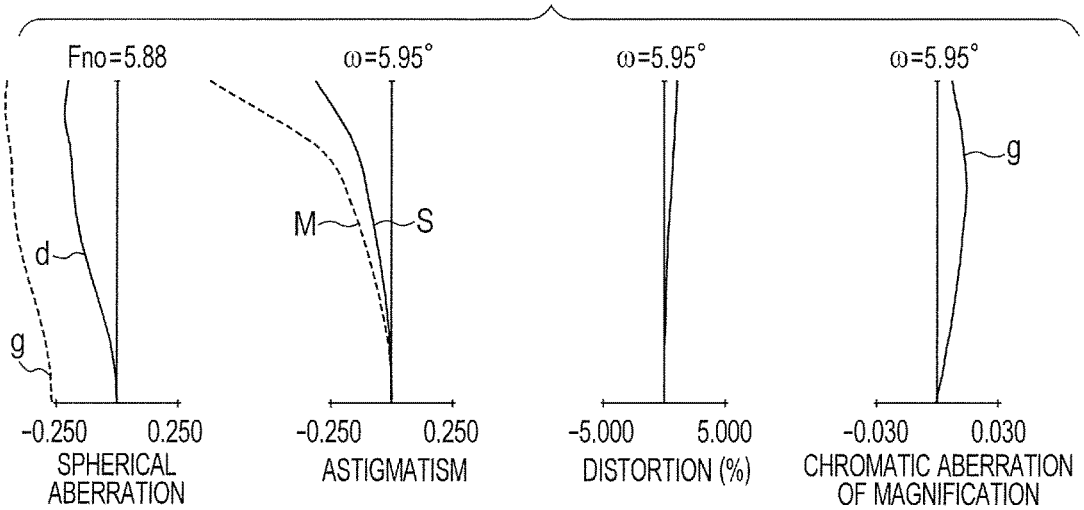
FIG. 9C is an aberration diagram of Embodiment 3 at the telephoto end when the imaging lateral magnification is −0.20.

FIG. 7 is a cross-sectional view of a zoom lens of Embodiment 3 at a wide angle end of the zoom lens when the focus is on an object at infinity. FIG. 8A, FIG. 8B, and FIG. 8C are longitudinal aberration diagrams of the zoom lens of Embodiment 3 at the wide angle end, at an intermediate zoom position, and at a telephoto end, respectively, when the focus is on the object at infinity. FIG. 9A, FIG. 9B, and FIG. 9C are aberration diagrams of the zoom lens of Embodiment 3 at the wide angle end when an imaging lateral magnification is −0.05, at the intermediate zoom position when the imaging lateral magnification is −0.10, and at the telephoto end when the imaging lateral magnification is −0.20, respectively. Embodiment 3 represents a zoom lens having a zoom ratio of 7.07 and an F-number of from 3.40 to 5.88.

Figure 10:
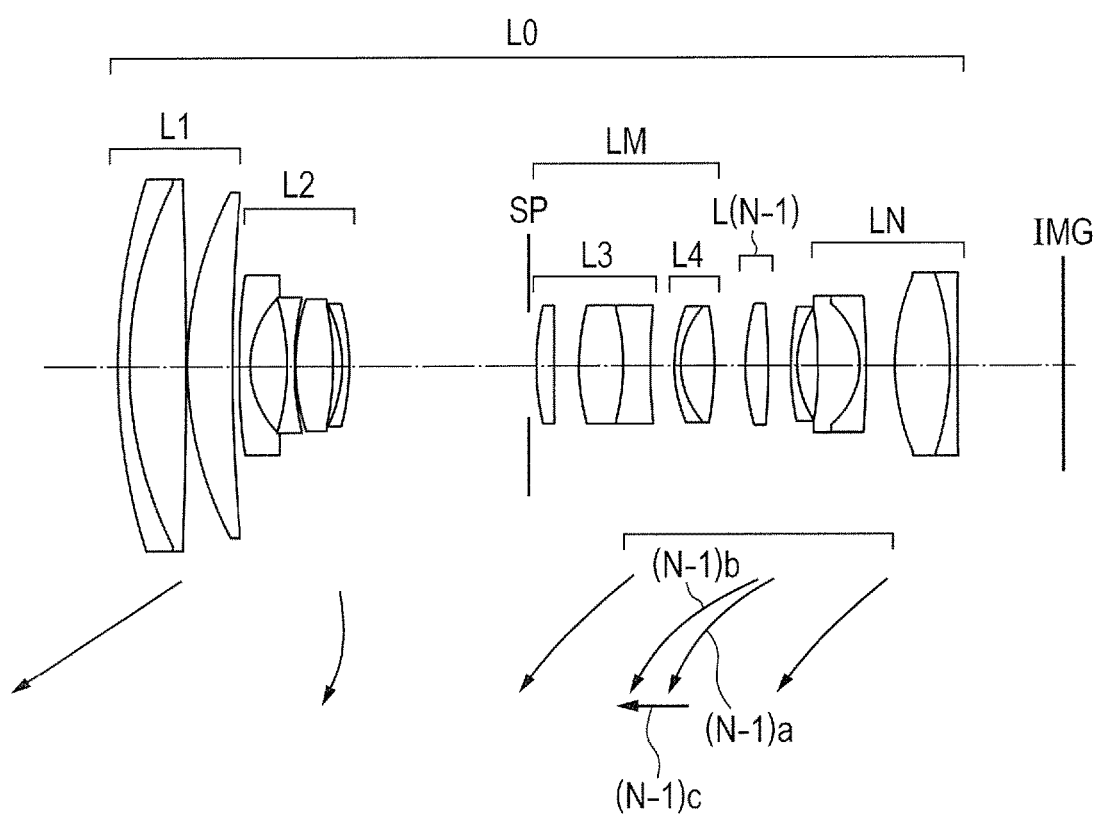
FIG. 10 is a cross-sectional view of a zoom lens of Embodiment 4 at a wide angle end.
Figure 11A:
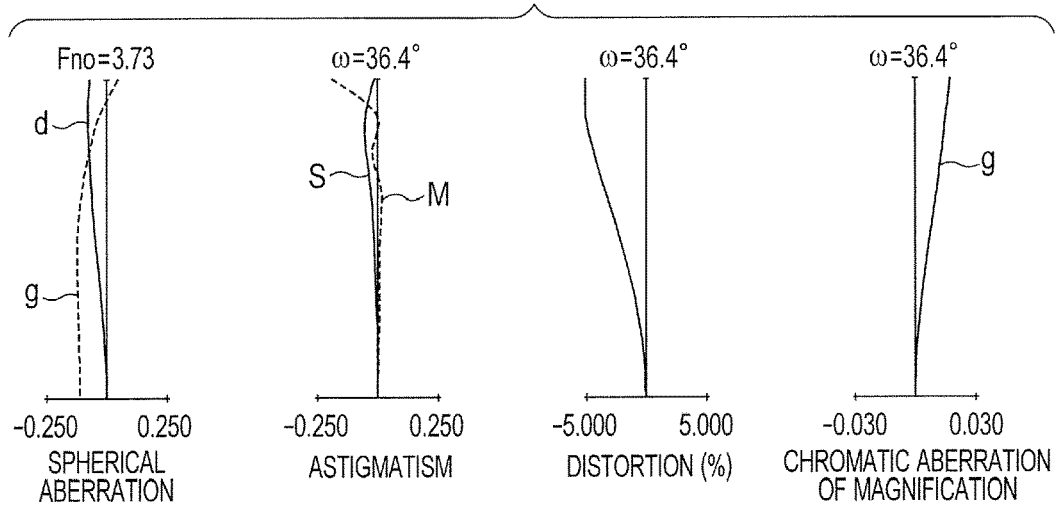
FIG. 11A is an aberration diagram of Embodiment 4 at the wide angle end when focused at infinity.
Figure 11B:
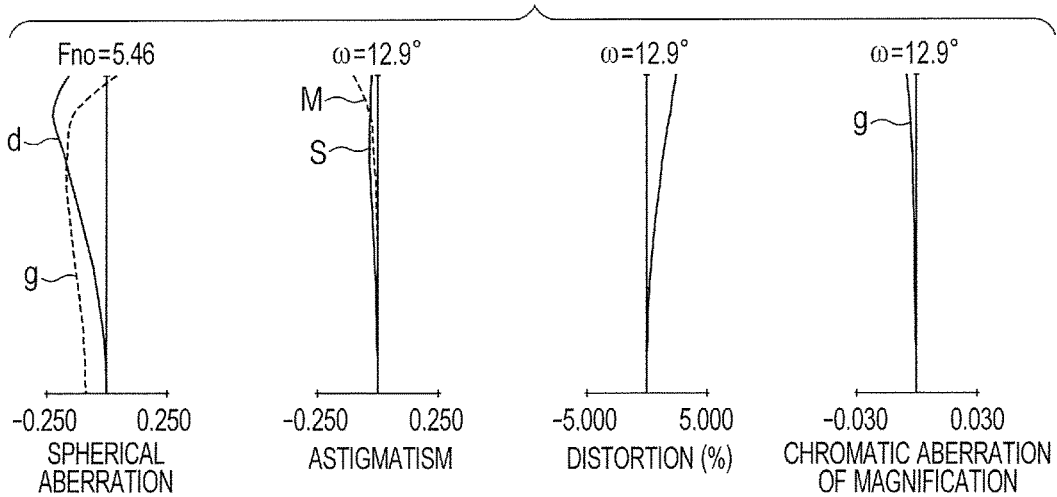
FIG. 11B is an aberration diagram of Embodiment 4 at an intermediate zoom position when focused at infinity.
Figure 11C:
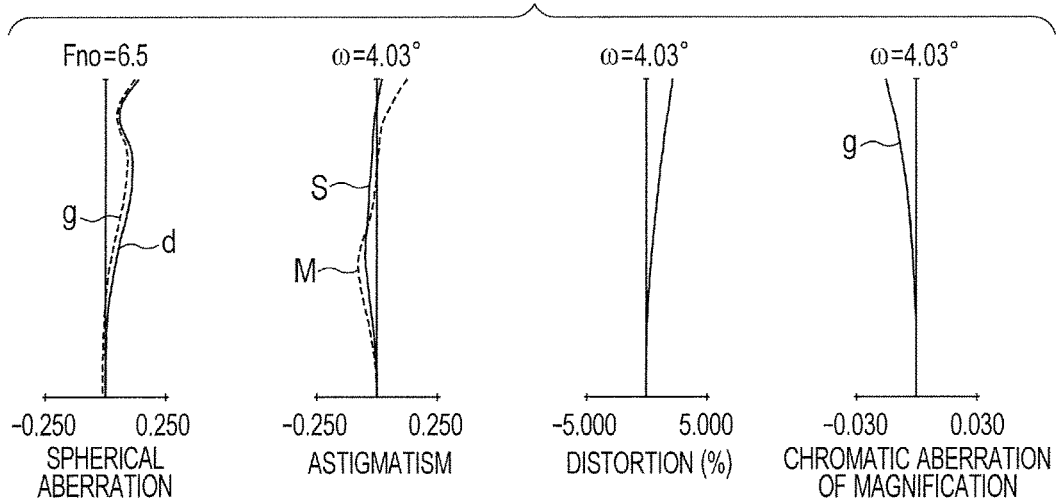
FIG. 11C is an aberration diagram of Embodiment 4 at a telephoto end when focused at infinity.
Figure 12A:
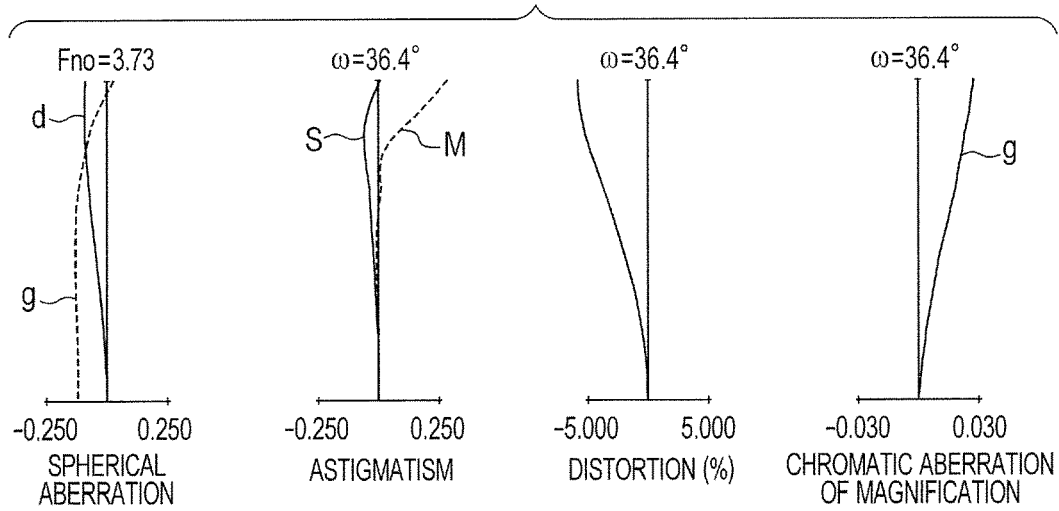
FIG. 12A is an aberration diagram of Embodiment 4 at the wide angle end when an imaging lateral magnification is −0.05.
Figure 12B:
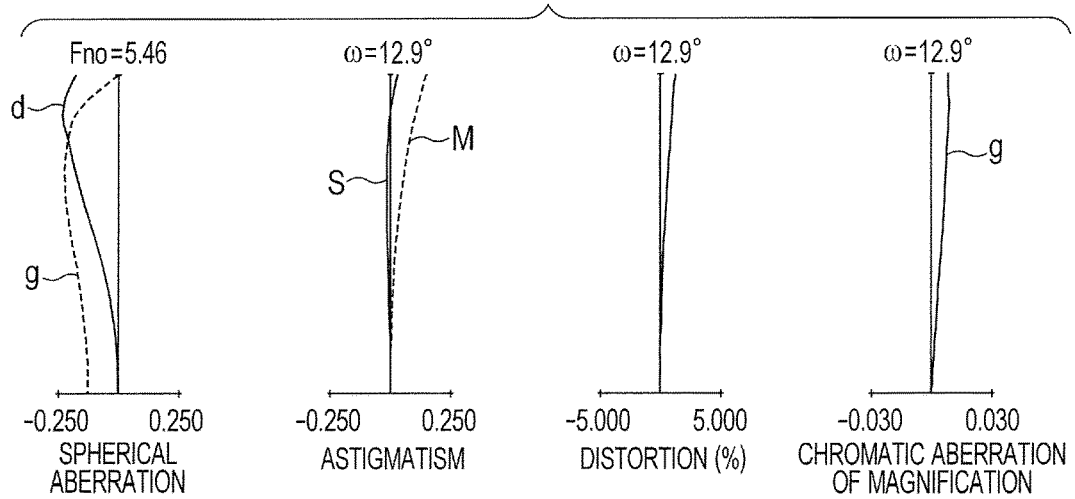
FIG. 12B is an aberration diagram of Embodiment 4 at the intermediate zoom position when the imaging lateral magnification is −0.10.
Figure 12C:
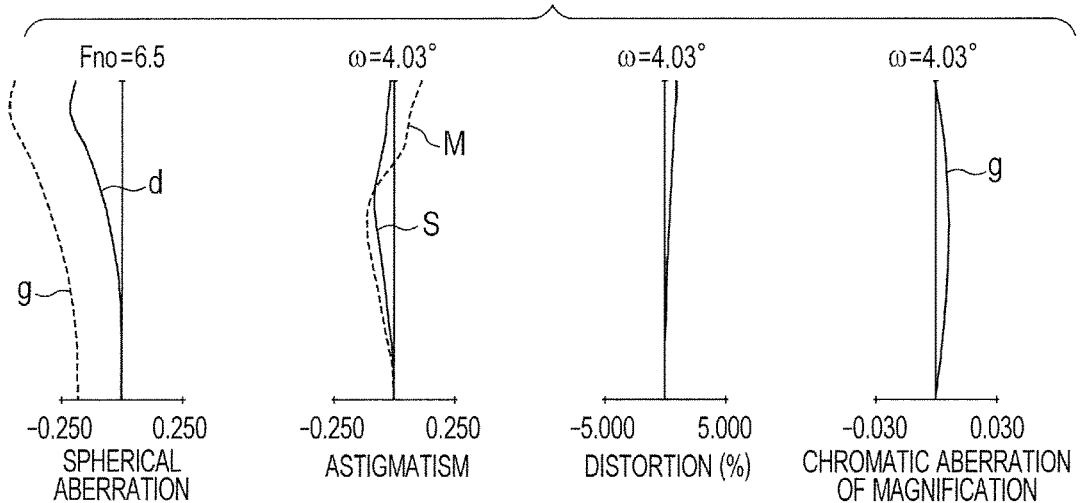
FIG. 12C is an aberration diagram of Embodiment 4 at the telephoto end when the imaging lateral magnification is −0.20.

FIG. 10 is a cross-sectional view of a zoom lens of Embodiment 4 at a wide angle end of the zoom lens when the focus is on an object at infinity. FIG. 11A, FIG. 11B, and FIG. 11C are longitudinal aberration diagrams of the zoom lens of Embodiment 4 at the wide angle end, at an intermediate zoom position, and at a telephoto end, respectively, when the focus is on the object at infinity. FIG. 12A, FIG. 12B, and FIG. 12C are aberration diagrams of the zoom lens of Embodiment 4 at the wide angle end when an imaging lateral magnification is −0.05, at the intermediate zoom position when the imaging lateral magnification is −0.10, and at the telephoto end when the imaging lateral magnification is −0.20, respectively. Embodiment 4 represents a zoom lens having a zoom ratio of 10.48 and an F-number of from 3.73 to 6.50.

Figure 13:
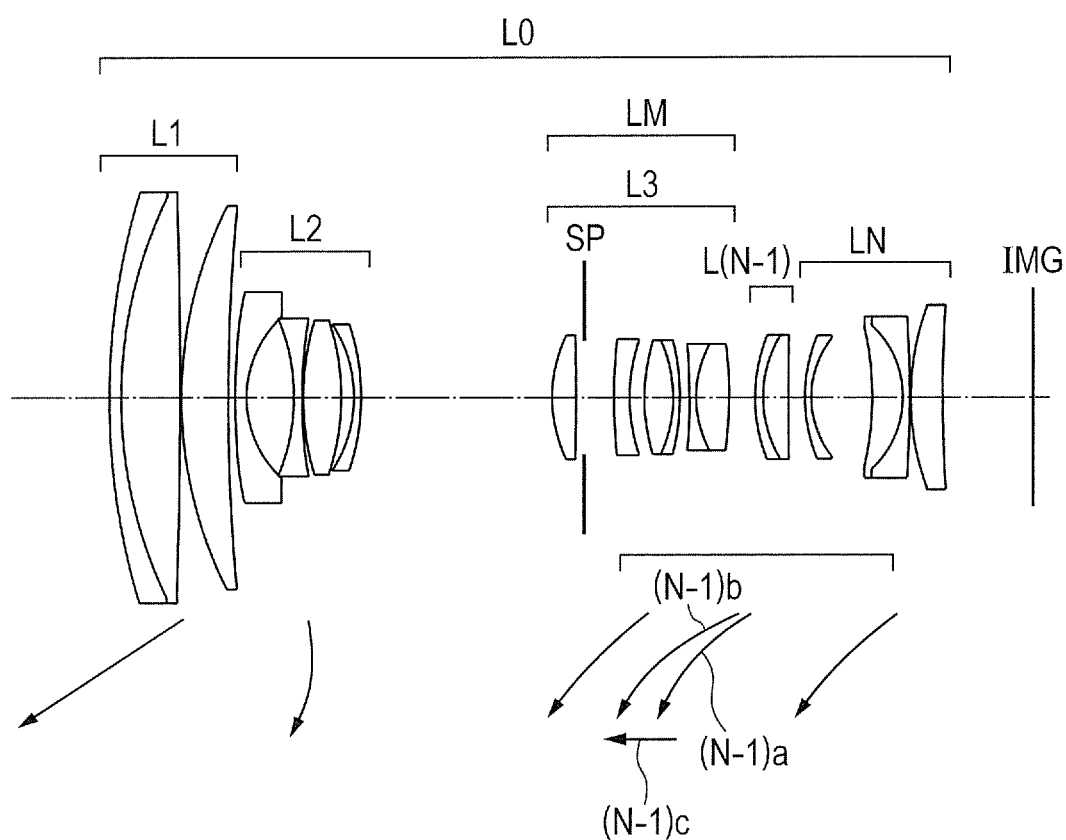
FIG. 13 is a cross-sectional view of a zoom lens of Embodiment 5 at a wide angle end.
Figure 14A:
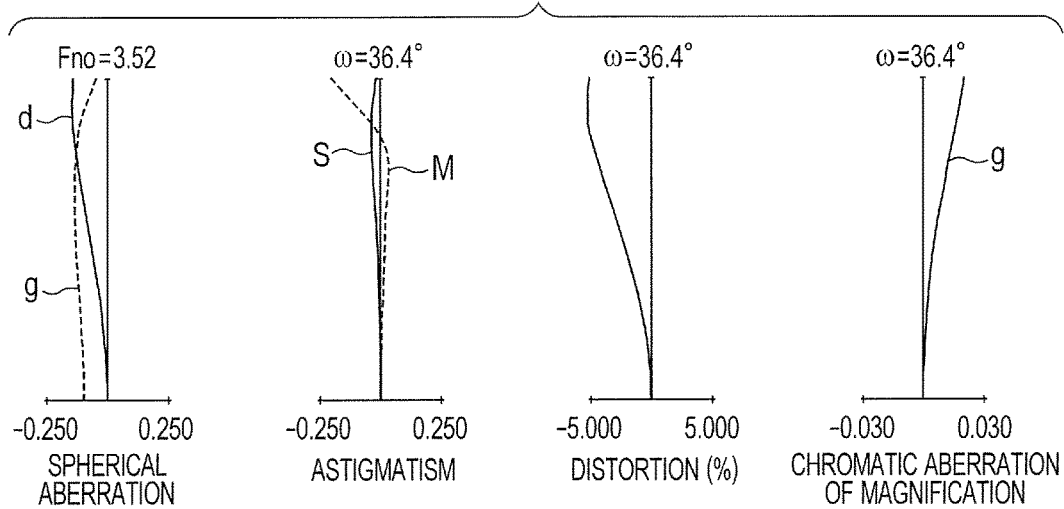
FIG. 14A is an aberration diagram of Embodiment 5 at the wide angle end when focused at infinity.
Figure 14B:
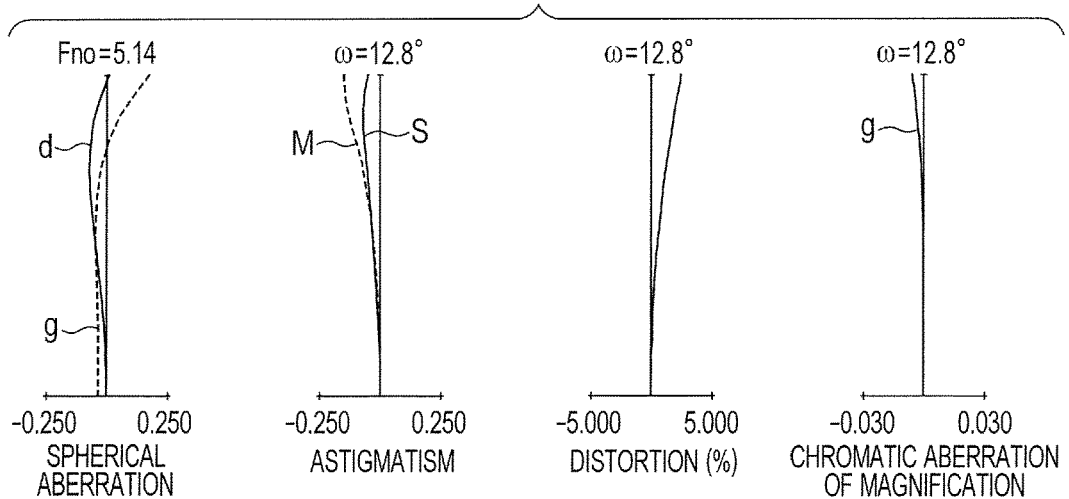
FIG. 14B is an aberration diagram of Embodiment 5 at an intermediate zoom position when focused at infinity.
Figure 14C:
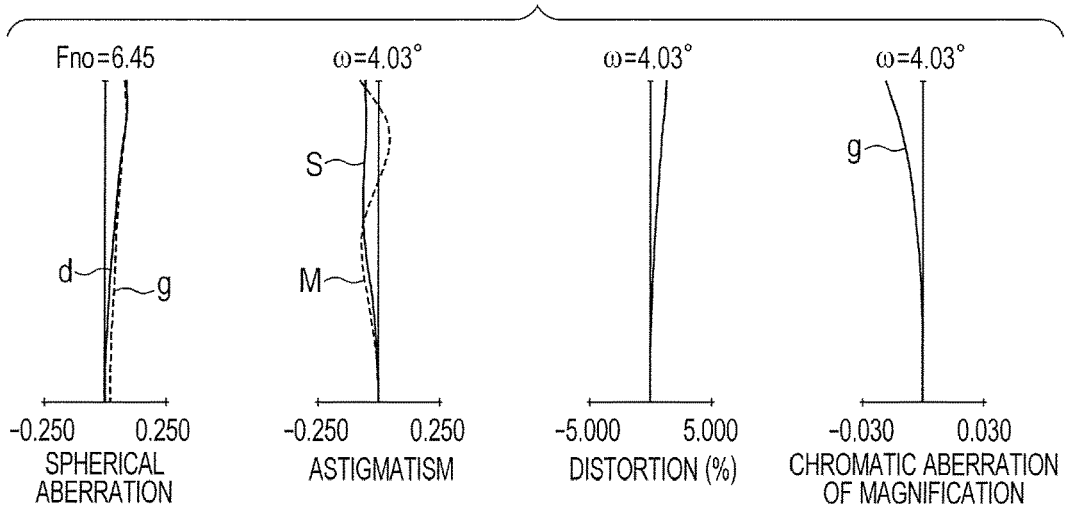
FIG. 14C is an aberration diagram of Embodiment 5 at a telephoto end when focused at infinity.
Figure 15A:
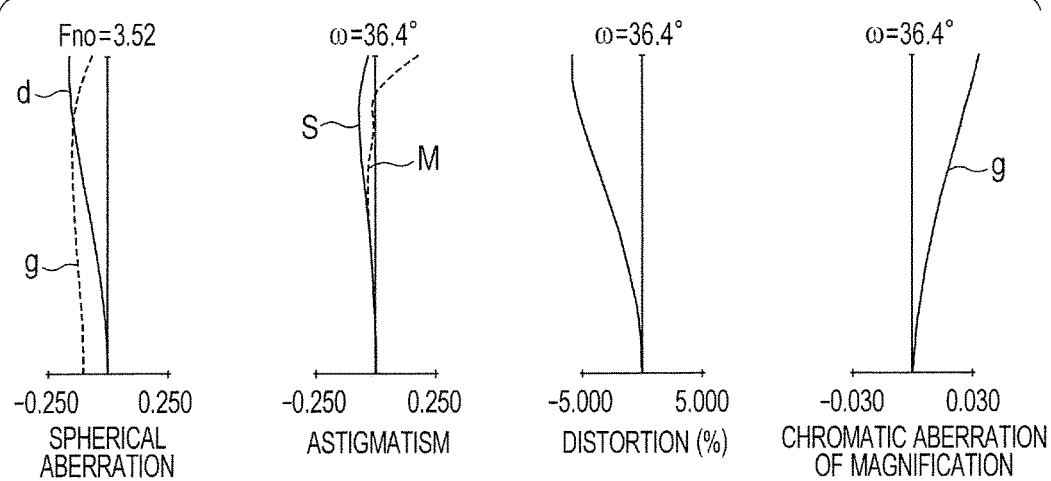
FIG. 15A is an aberration diagram of Embodiment 5 at the wide angle end when an imaging lateral magnification is −0.05.
Figure 15B:
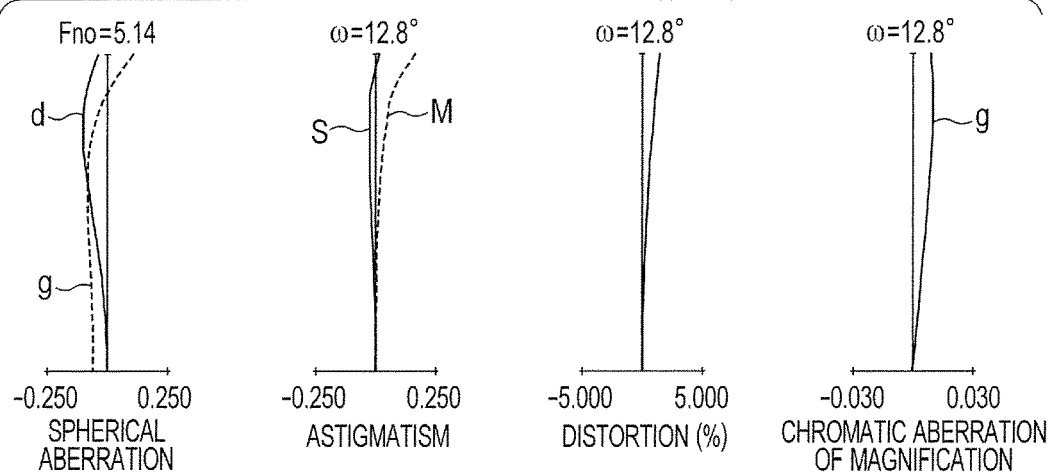
FIG. 15B is an aberration diagram of Embodiment 5 at the intermediate zoom position when the imaging lateral magnification is −0.10.
Figure 15C:
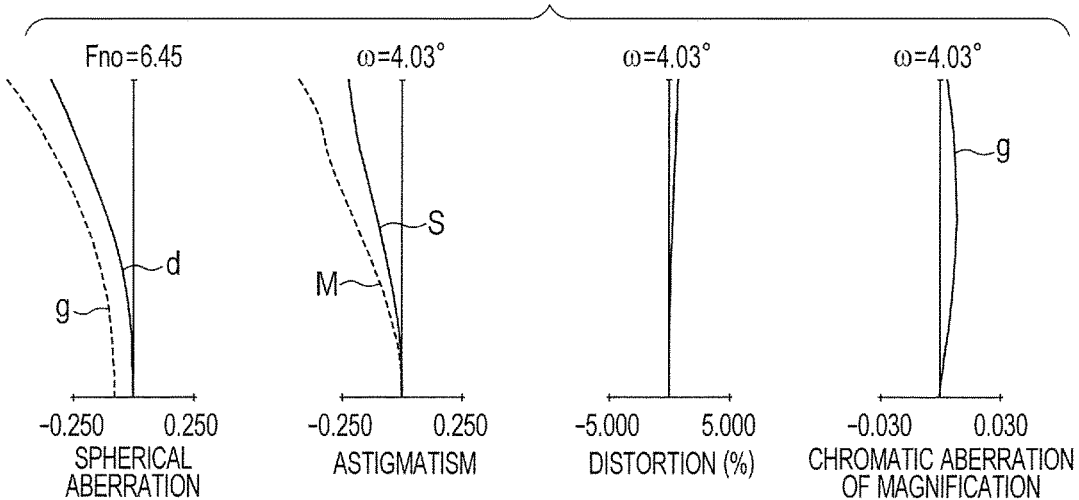
FIG. 15C is an aberration diagram of Embodiment 5 at the telephoto end when the imaging lateral magnification is −0.20.

FIG. 13 is a cross-sectional view of a zoom lens of Embodiment 5 at a wide angle end of the zoom lens when the focus is on an object at infinity. FIG. 14A, FIG. 14B, and FIG. 14C are longitudinal aberration diagrams of the zoom lens of Embodiment 5 at the wide angle end, at an intermediate zoom position, and at a telephoto end, respectively, when the focus is on the object at infinity. FIG. 15A, FIG. 15B, and FIG. 15C are aberration diagrams of the zoom lens of Embodiment 5 at the wide angle end when an imaging lateral magnification is −0.05, at the intermediate zoom position when the imaging lateral magnification is −0.10, and at the telephoto end when the imaging lateral magnification is −0.20, respectively. Embodiment 5 represents a zoom lens having a zoom ratio of 10.48 and an F-number of from 3.52 to 6.45.

Figure 16:
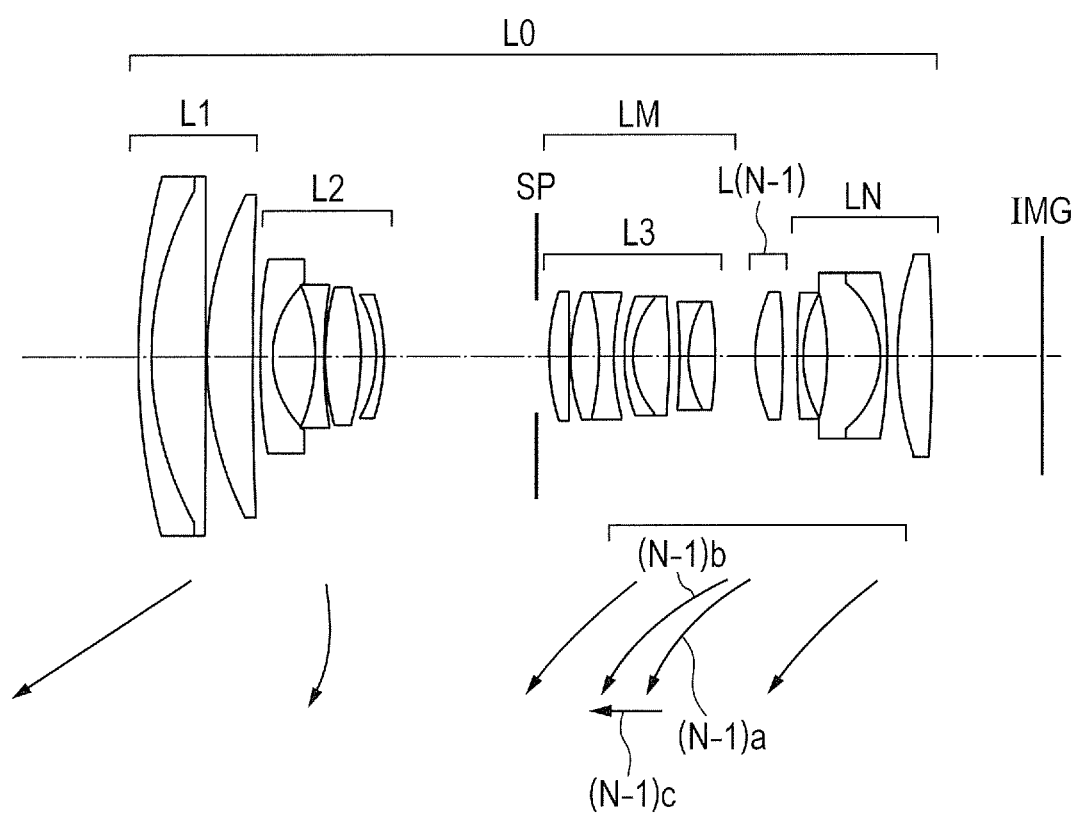
FIG. 16 is a cross-sectional view of a zoom lens of Embodiment 6 at a wide angle end.
Figure 18A:
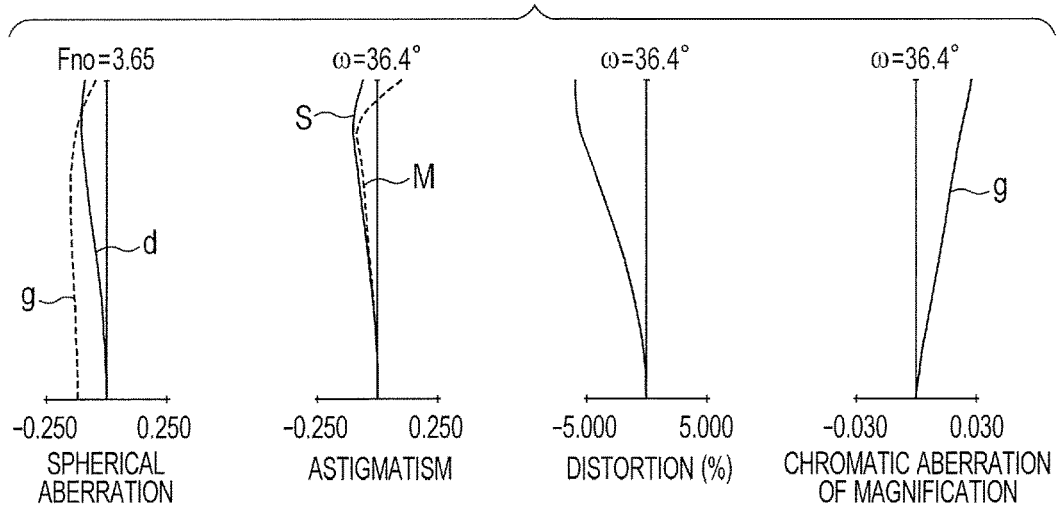
FIG. 18A is an aberration diagram of Embodiment 6 at the wide angle end when an imaging lateral magnification is −0.05.
Figure 18B:
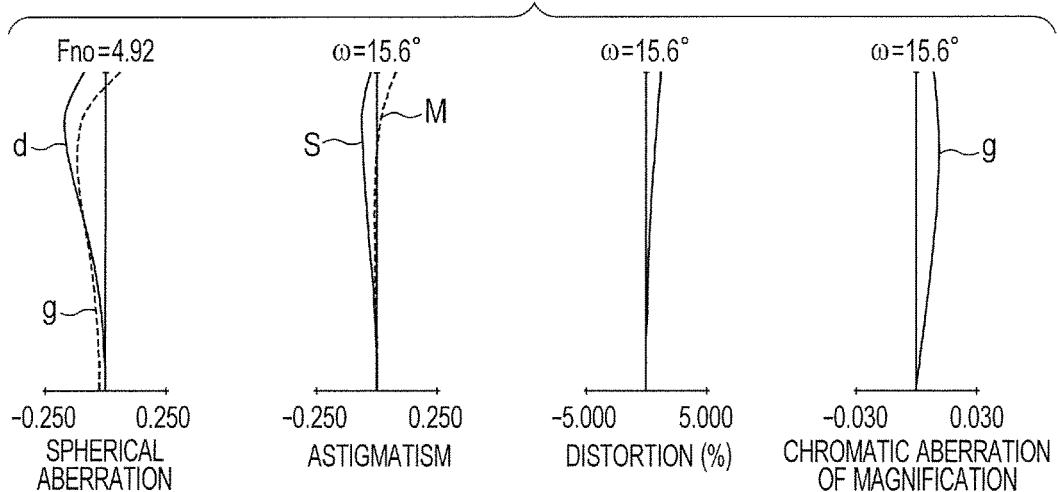
FIG. 18B is an aberration diagram of Embodiment 6 at the intermediate zoom position when the imaging lateral magnification is −0.10.
Figure 18C:
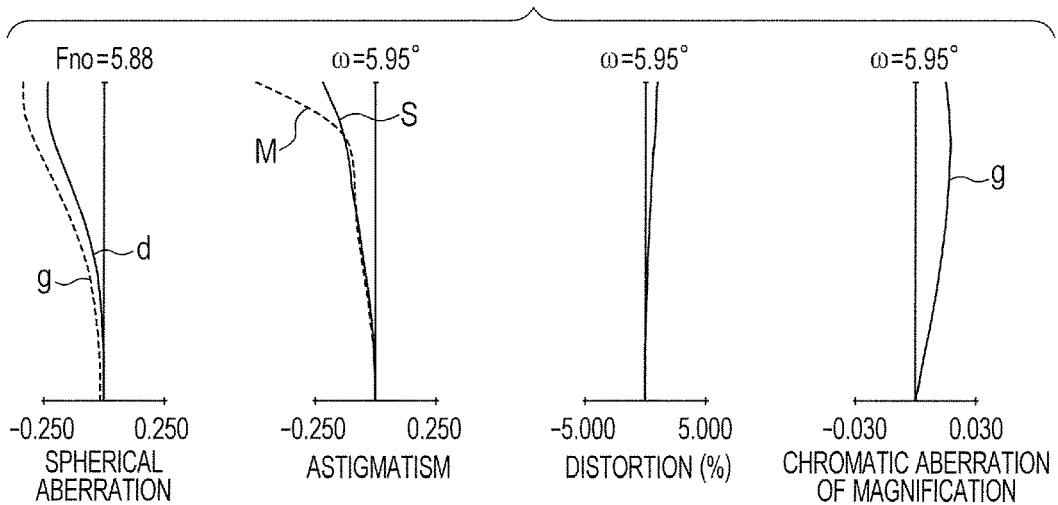
FIG. 18C is an aberration diagram of Embodiment 6 at the telephoto end when the imaging lateral magnification is −0.20.

FIG. 16 is a cross-sectional view of a zoom lens of Embodiment 6 at a wide angle end of the zoom lens when the focus is on an object at infinity. FIG. 17A, FIG. 17B, and FIG. 17C are longitudinal aberration diagrams of the zoom lens of Embodiment 6 at the wide angle end, at an intermediate zoom position, and at a telephoto end, respectively, when the focus is on the object at infinity. FIG. 18A, FIG. 18B, and FIG. 18C are aberration diagrams of the zoom lens of Embodiment 6 at the wide angle end when an imaging lateral magnification is −0.05, at the intermediate zoom position when the imaging lateral magnification is −0.10, and at the telephoto end when the imaging lateral magnification is −0.20, respectively. Embodiment 6 represents a zoom lens having a zoom ratio of 7.07 and an F-number of from 3.65 to 5.88.

Figure 19:
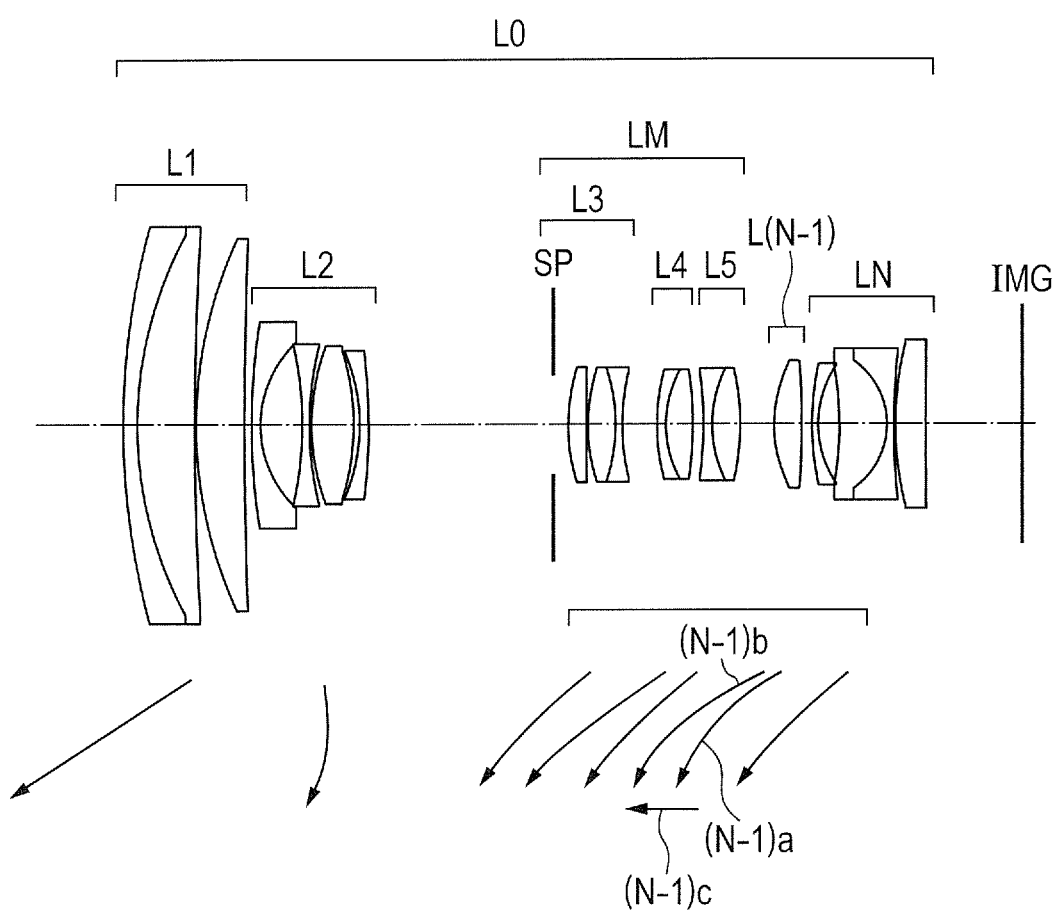
FIG. 19 is a cross-sectional view of a zoom lens of Embodiment 7 at a wide angle end.
Figure 20A:
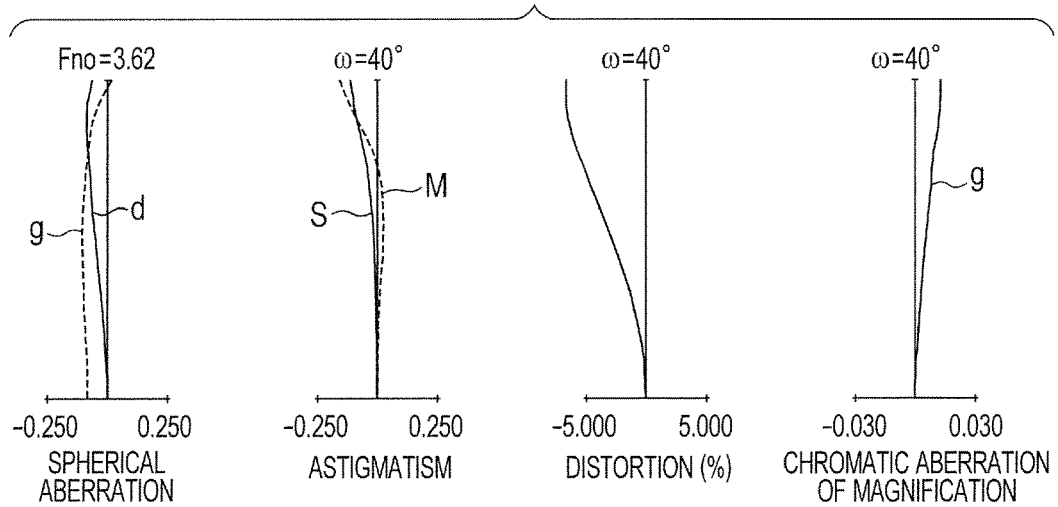
FIG. 20A is an aberration diagram of Embodiment 7 at the wide angle end when focused at infinity.
Figure 20B:
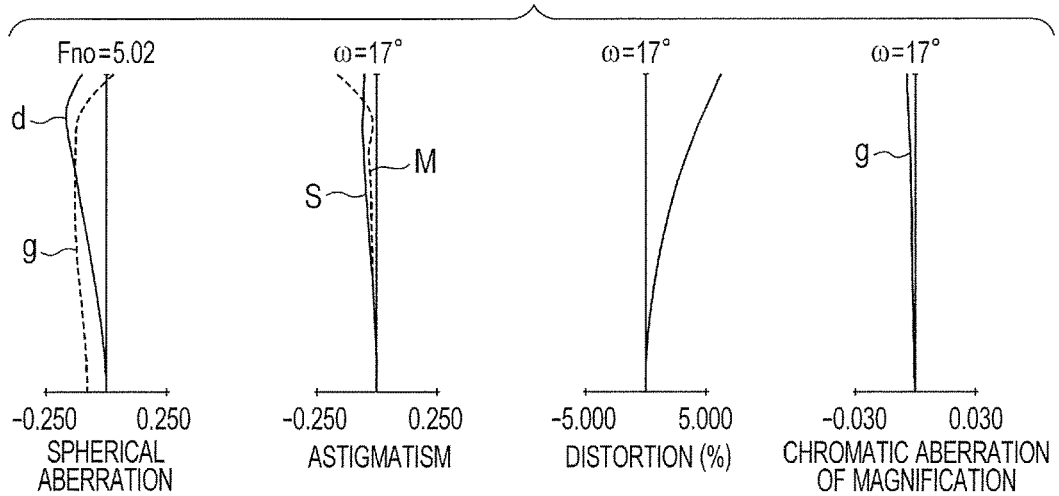
FIG. 20B is an aberration diagram of Embodiment 7 at an intermediate zoom position when focused at infinity.
Figure 20C:
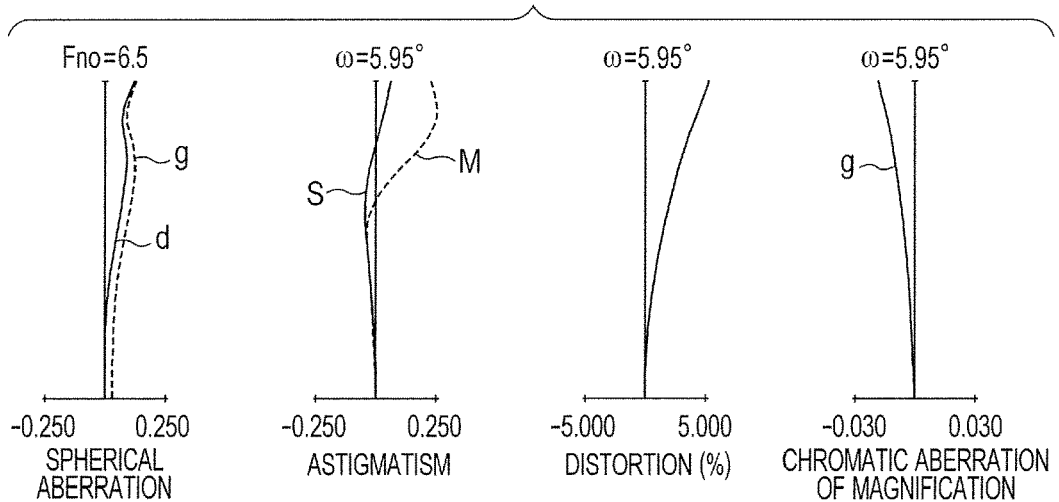
FIG. 20C is an aberration diagram of Embodiment 7 at a telephoto end when focused at infinity.
Figure 21A:
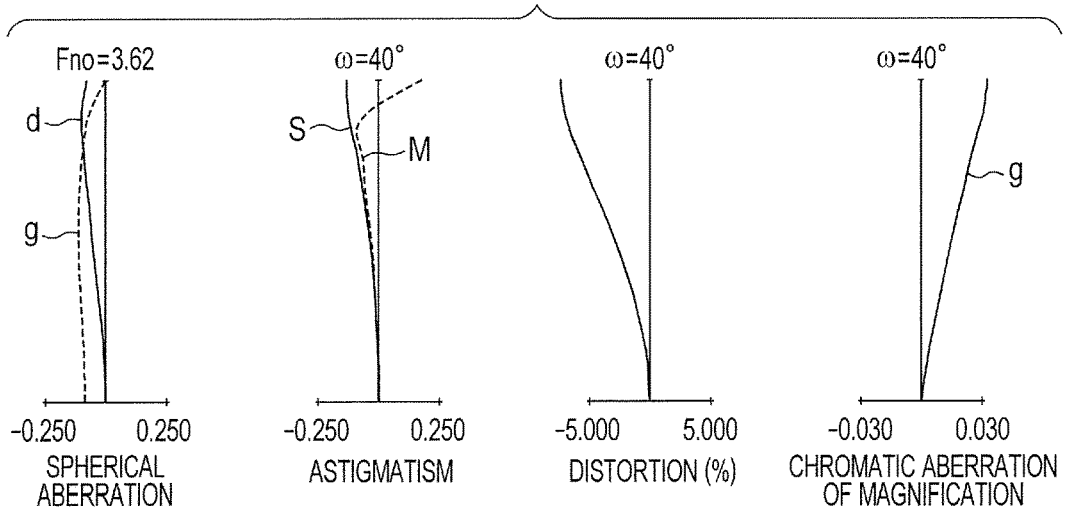
FIG. 21A is an aberration diagram of Embodiment 7 at the wide angle end when an imaging lateral magnification is −0.05.
Figure 21B:
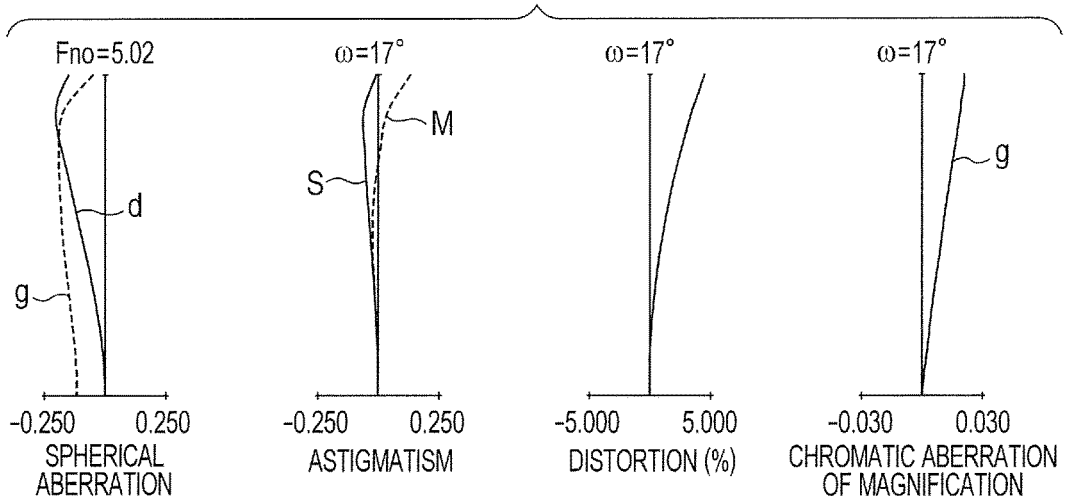
FIG. 21B is an aberration diagram of Embodiment 7 at the intermediate zoom position when the imaging lateral magnification is −0.10.
Figure 21C:
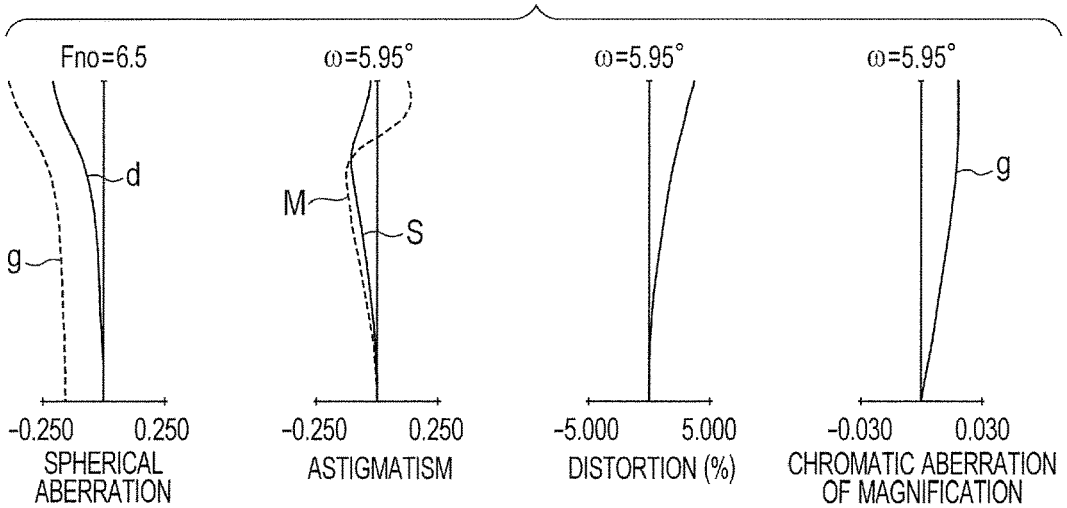
FIG. 21C is an aberration diagram of Embodiment 7 at the telephoto end when the imaging lateral magnification is −0.20.
Figure 22A:
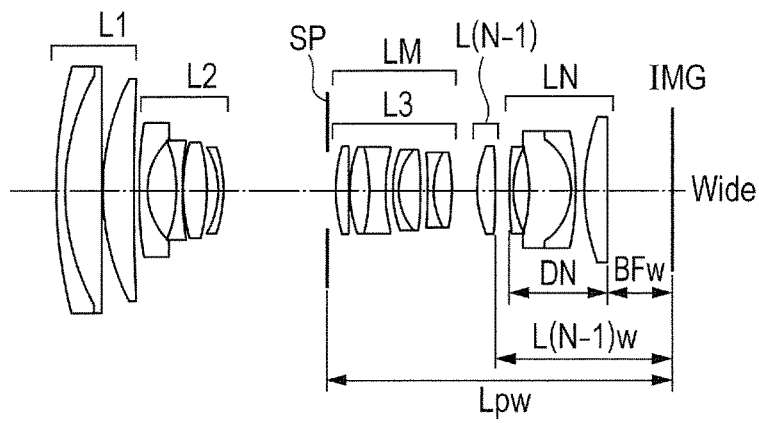
FIG. 22A is an explanatory view of each parameter in the zoom lens.
Figure 22B:
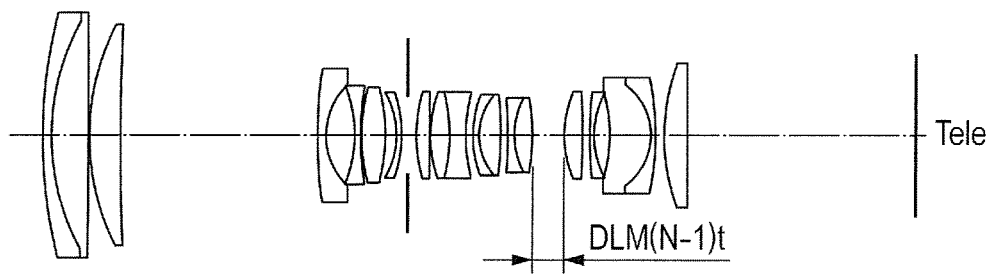
FIG. 22B is an explanatory view of each parameter in the zoom lens.

FIG. 19 is a cross-sectional view of a zoom lens of Embodiment 7 at a wide angle end of the zoom lens when the focus is on an object at infinity. FIG. 20A, FIG. 20B, and FIG. 20C are longitudinal aberration diagrams of the zoom lens of Embodiment 7 at the wide angle end, at an intermediate zoom position, and at a telephoto end, respectively, when the focus is on the object at infinity. FIG. 21A, FIG. 21B, and FIG. 21C are aberration diagrams of the zoom lens of Embodiment 7 at the wide angle end when an imaging lateral magnification is −0.05, at the intermediate zoom position when the imaging lateral magnification is −0.10, and at the telephoto end when the imaging lateral magnification is −0.20, respectively. Embodiment 7 represents a zoom lens having a zoom ratio of 8.45 and an F-number of from 3.68 to 6.50. FIG. 22A and FIG. 22B are explanatory diagrams of parameters in the zoom lens.

Figure 23:
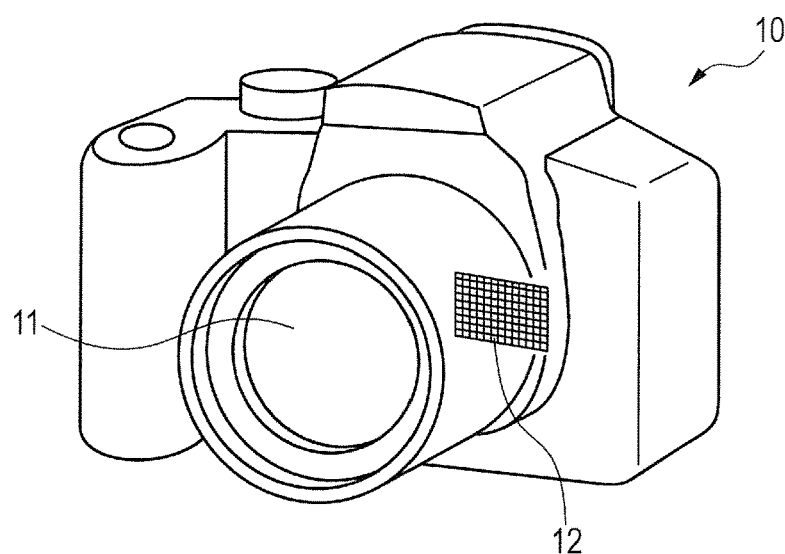
FIG. 23 is a schematic view of a main part of an image pickup apparatus.

FIG. 23 is a schematic view of a main part of a camera (image pickup apparatus) including the zoom lens. The zoom lens of each of Embodiments is an image pickup optical system which is to be used in an image pickup apparatus, for example, a video camera, a digital camera, or a silver-halide film camera. In the cross-sectional views of the zoom lens, the left side is the object side (front side), and the right side is the image side (rear side). In the cross-sectional views of the zoom lens, a zoom lens is denoted by L0. The order of a lens unit from the object side is represented by i, and an i-th lens unit is denoted by Li. An intermediate lens unit LM includes at least one lens unit. An (N−1)-th lens unit is denoted by L(N−1), and an N-th lens unit is denoted by LN. N is an integer of 5 or more.

In Embodiments 1, 2, 3, 5, and 6, the zoom lens consists of, in order from the object side to the image side, a first lens unit L1 having a positive refractive power, a second lens unit L2 having a negative refractive power, a third lens unit L3 having a positive refractive power, a fourth lens unit L4 having a positive refractive power, and a fifth lens unit L5 having a negative refractive power. Each lens unit is configured to move so that the interval between each pair of adjacent lens units is changed during zooming. In Embodiments 1, 2, 3, 5, and 6, the third lens unit L3 corresponds to the intermediate lens unit LM.

In Embodiment 4, the zoom lens consists of, in order from the object side to the image side, the following lens units: a first lens unit L1 having a positive refractive power, a second lens unit L2 having a negative refractive power, a third lens unit L3 having a positive refractive power, a fourth lens unit L4 having a positive refractive power, an (N−1)-th lens unit L(N−1) having a positive refractive power, and an N-th lens unit LN having a negative refractive power. Each lens unit is configured to move so that the interval between each pair of adjacent lens units is changed during zooming. In Embodiment 4, the third lens unit L3 and the fourth lens unit L4 correspond to the intermediate lens unit LM.

In Embodiment 7, the zoom lens includes, in order from the object side to the image side, a first lens unit L1 having a positive refractive power, a second lens unit L2 having a negative refractive power, a third lens unit L3 having a positive refractive power, a fourth lens unit L4 having a positive refractive power, and a fifth lens unit L5 having a positive refractive power. The zoom lens further consists of an (N−1)-th lens unit L(N−1) having a positive refractive power, and an N-th lens unit LN having a negative refractive power. Each lens unit is configured to move so that the interval between each pair of adjacent lens units is changed during zooming. In Embodiment 7, the third lens unit L3, the fourth lens unit L4, and the fifth lens unit L5 correspond to the intermediate lens unit LM.

In the cross-sectional view of each zoom lens, an aperture stop SP is arranged on the image side of the second lens unit L2. On an image plane IMG, an image pickup plane of a solid-state image pickup element (photoelectric convertor), for example, a CCD sensor or a CMOS sensor is put when the zoom lens of the present invention is used as a photographing optical system of a video camera or a digital still camera, and a film surface is put when the zoom lens of the present invention is used for a silver-halide film camera.

In the spherical aberration diagram, a solid line d indicates a d-line (wavelength of 587.6 nm), and a dotted line g indicates a g-line (wavelength of 435.8 nm). In the astigmatism diagram, a dotted line M indicates a meridional image plane, and a solid line S indicates a sagittal image plane. A chromatic aberration of magnification is indicated by the g-line. Symbol ω represents a half angle of view (degrees), and symbol Fno represents an F-number. In each of Embodiments, which are to be described below, the wide angle end and the telephoto end respectively refer to zoom positions obtained when each lens unit is located at both ends of a mechanically movable range thereof on an optical axis. Arrows indicate movement loci of respective lens units during zooming from the wide angle end to the telephoto end.

Further, each Embodiment employs a rear-focus method in which focusing is performed by moving the (N−1)-th lens unit L(N−1) on the optical axis. A solid-line curve (N−1)a and a dotted-line curve (N−1)b related to the (N−1)-th lens unit L(N−1) are movement loci for correcting an image plane variation caused by zooming when respectively focused at infinity and close distance.

In the zoom lens of each Embodiment, the (N−1)-th lens unit L(N−1) is configured to move toward the object side during zooming from the wide angle end to the telephoto end so that a space between the intermediate lens unit LM and the (N−1)-th lens unit L(N−1) is effectively used and the total lens length is reduced. Further, in each Embodiment, when focusing is performed from infinity to close distance at the telephoto end, as indicated by an arrow (N−1)c, the (N−1)-th lens unit L(N−1) is moved forward.

When the number of lenses forming the focus lens unit configured to move for focusing is reduced, a residual aberration of the focus lens unit is increased, and an aberration variation during focusing is increased. Further, when the refractive power of the focus lens unit is decreased in order to reduce the aberration variation during focusing, an amount of movement during focusing is increased and the zoom lens is increased in size. Therefore, in order to downsize the zoom lens and reduce the size and the weight of the focus lens unit, it is important to employ a lens unit configuration capable of effectively reducing the amount of movement during focusing.

The zoom lens of each of Embodiments includes, in order from the object side to the image side, the first lens unit L1 having a positive refractive power, the second lens unit L2 having a negative refractive power, the intermediate lens unit LM including at least one lens unit, the (N−1)-th lens unit L(N−1) having a positive refractive power, and the N-th lens unit LN having a negative refractive power. Further, the interval between each pair of adjacent lens units is changed during zooming. The (N−1)-th lens unit L(N−1) is configured to move for focusing. Further, the (N−1)-th lens unit L(N−1) is a focus lens unit.

During zooming, all of the lens units are configured to move toward the object side at the telephoto end as compared to the wide angle end. The zoom lens is a so-called positive lead type zoom lens in which a lens unit having a positive refractive power is arranged closest to the object side, and thus a higher zoom ratio may be easily obtained by moving the lens unit to the object side.

The zoom lens consisting of, in order from the object side to the image side, the first lens unit to the fifth lens unit having positive, negative, positive, positive, and negative refractive powers has a so-called telephoto-type refractive power arrangement from the third lens unit to the fifth lens unit. Therefore, the total lens length is easily reduced. Further, when the fourth lens unit is a focus lens unit, the amount of movement during focusing can be reduced due to the divergence effect of the fifth lens unit having a negative refractive power without the need to extremely increase the refractive power of the fourth lens unit. Therefore, the present invention is effective to downsize the zoom lens and reduce the size and the weight of the focus lens unit.

In the zoom lens of each of Embodiments, the negative refractive power of the N-th lens unit LN is set to be relatively stronger as compared to the intermediate lens unit LM and the (N−1)-th lens unit L(N−1) so that the amount of movement during focusing is decreased and the total lens length is reduced. Further, the negative refractive power of the N-th lens unit LN is increased so that the Petzval sum, which is based on the intermediate lens unit LM and the (N−1)-th lens unit L(N−1) being lens units having positive refractive powers, is canceled and the aberration correction is facilitated.

Further, in the zoom lens of each of Embodiments, the (N−1)-th lens unit L(N−1) consists of a single lens element. The single lens element means a single lens or a cemented lens obtained by cementing a plurality of lenses. With use of the (N−1)-th lens unit L(N−1) consisting of a single lens element, the weight of the (N−1)-th lens unit L(N−1) can be easily reduced.

Meanwhile, when the (N−1)-th lens unit L(N−1) is formed of a single lens element, various aberrations increasingly occur due to the (N−1)-th lens unit L(N−1), and the aberration variation is increased during focusing. Therefore, the refractive power arrangement and the lens configuration of each of the intermediate lens unit LM, the (N−1)-th lens unit L(N−1), and the N-th lens unit LN are appropriately set so that the zoom lens is downsized and the focus lens unit is reduced in weight.

In each of Embodiments, the (N−1)-th lens unit L(N−1) is formed of a single lens element so that the weight of the focus lens unit is reduced. In each of Embodiments, a focal length of the intermediate lens unit LM at the wide angle end is represented by fLM, a focal length of the (N−1)-th lens unit L(N−1) is represented by f(N−1), and a focal length of the N-th lens unit LN is represented by fN. At this time, the following conditional expression is satisfied:

$$0.4 < (fN/fLM) \times (fN/f(N-1)) < 1.1 \quad (1).$$

Conditional Expression (1) defines the focal length of each of the intermediate lens unit LM, the (N−1)-th lens unit L(N−1), and the N-th lens unit LN. When a value exceeds the upper limit of Conditional Expression (1) and the negative refractive power of the N-th lens unit LN is decreased, the amount of movement of the (N−1)-th lens unit L(N−1) during focusing is increased, and the zoom lens is disadvantageously increased in size. Further, it becomes difficult to cancel the Petzval sum caused in the intermediate lens unit LM and the (N−1)-th lens unit L(N−1), and the image plane characteristic is disadvantageously increased.

When the value falls below the lower limit of Conditional Expression (1) and the negative refractive power of the N-th lens unit LN is increased, the amount of movement of the (N−1)-th lens unit L(N−1) during focusing is decreased, but it disadvantageously becomes too difficult to control the drive. Further, when the negative refractive power of the N-th lens unit LN is increased, an exit pupil position comes close to the image plane, and hence this case is effective for reduction in lens diameter and downsizing of the zoom lens. However, an incident angle of a ray to the image plane is increased, and the telecentric performance is disadvantageously reduced.

It is preferred that the numerical range of Conditional Expression (1) be set as follows:

$$0.41 < (fN/fLM) \times (fN/f(N-1)) < 1.09 \quad (1a).$$

As described above, according to the present invention, it is possible to obtain a compact and high-zoom-ratio zoom lens, which includes a compact and lightweight focus lens unit, and achieves satisfactory optical performance over the entire object distance from far distance to close distance.

In the present invention, it is further preferred that at least one of the following conditional expressions be satisfied. A focal length of the first lens unit L1 is represented by f1, and a focal length of the zoom lens at the wide angle end is represented by fw. The aperture stop SP is provided on the image side of the second lens unit L2, and a distance on the optical axis from a lens surface closest to the object side of the (N−1)-th lens unit L(N−1) to the image plane at the wide angle end is represented by L(N−1)w. A distance on the optical axis from the aperture stop SP to the image plane at the wide angle end is represented by Lpw. A distance on the optical axis from a lens surface closest to the object side of the N-th lens unit LN to a lens surface closest to the image side of the N-th lens unit LN is represented by DN. A back focus at the wide angle end is represented by BFw.

A distance on the optical axis from a lens surface closest to the image side of the intermediate lens unit LM to a lens surface closest to the object side of the (N−1)-th lens unit L(N−1) at the telephoto end is represented by D3(N−1)t. The focal length of the zoom lens at the telephoto end is represented by ft. An imaging lateral magnification of the N-th lens unit LN at the telephoto end is represented by βNt.

The imaging lateral magnification of the N-th lens unit LN at the wide angle end is represented by βNw. In FIG. 22A and FIG. 22B, distances and the like related to the parameters of the above-mentioned conditional expressions are shown with use of the cross-sectional view of the zoom lens of FIG. 1. FIG. 22A and FIG. 22B are cross-sectional views of the zoom lens at the wide angle end and the telephoto end, respectively, when focused at infinity.

Then, it is preferred to satisfy at least one of the following conditional expressions:

$$0.400 \leq fLM/f(N-1) < 1.089 \quad (2);$$

$$1.862 \leq f1/fw < 6.201 \quad (3);$$

$$0.383 < L(N-1)w/Lpw < 0.674 \quad (4);$$

$$0.759 < DN/BFw < 1.896 \quad (5);$$

$$0.025 < DLM(N-1)t/ft < 0.072 \quad (6);$$

$$2.16 < \beta Nt < 4.44 \quad (7); \text{ and}$$

$$1.25 < \beta Nt/\beta Nw < 1.96 \quad (8).$$

Conditional Expression (2) defines a ratio of the focal length of the intermediate lens unit LM to the focal length of the (N−1)-th lens unit L(N−1). When the ratio exceeds the upper limit of Conditional Expression (2) and the positive refractive power of the (N−1)-th lens unit L(N−1) is increased, the residual aberration of the (N−1)-th lens unit L(N−1) is increased, and the aberration variation during focusing, in particular, the variation in spherical aberration at the telephoto end is disadvantageously increased. When the ratio falls below the lower limit of Conditional Expression (2) and the positive refractive power of the intermediate lens unit LM is increased, it becomes difficult to correct various aberrations caused in the intermediate lens unit LM. It disadvantageously becomes particularly difficult to correct the spherical aberration at the telephoto end.

Conditional Expression (3) defines the focal length of the first lens unit L1 and the focal length of the zoom lens at the wide angle end. When the ratio exceeds the upper limit of Conditional Expression (3) and the refractive power of the first lens unit L1 is decreased, the amount of movement of the first lens unit L1 during zooming is increased, and the total lens length is disadvantageously increased. When the ratio falls below the lower limit of Conditional Expression (3) and the power of the first lens unit L1 is increased, the lens unit thickness of the first lens unit L1 is increased. Thus, a height of incidence of the off-axial ray is increased at the wide angle end, and an effective diameter of a front lens element is disadvantageously increased.

Conditional Expression (4) defines a positional relationship between the aperture stop SP and the (N−1)-th lens unit L(N−1) at the wide angle end. When the ratio exceeds the upper limit of Conditional Expression (4) and the (N−1)-th lens unit L(N−1) comes close to the aperture stop SP, it disadvantageously becomes difficult to ensure the moving space for focusing. When the ratio falls below the lower limit of Conditional Expression (4) and the (N−1)-th lens unit L(N−1) comes close to the image plane, the height of incidence of the off-axial ray passing through the (N−1)-th lens unit L(N−1) at the wide angle end is increased, and the weight of the (N−1)-th lens unit L(N−1) is disadvantageously increased.

Conditional Expression (5) defines a relationship between the lens thickness of the N-th lens unit LN and the back focus at the wide angle end. In order to reduce the total lens length and the amount of movement of the focus lens unit, the zoom lens of each of Embodiments has a refractive power arrangement in which the negative refractive power of the N-th lens unit LN is strong. Therefore, in order to suppress the aberration caused in the N-th lens unit LN, the thickness of the N-th lens unit LN is increased and the degree of freedom for aberration correction is enhanced.

When the ratio falls below the lower limit of Conditional Expression (5) and the lens unit thickness of the N-th lens unit LN is decreased, it becomes difficult to correct the aberrations caused in the N-th lens unit LN. It becomes particularly difficult to correct the Petzval sum or correct the spherical aberration at the telephoto end. When the ratio exceeds the upper limit of Conditional Expression (5) and the lens unit thickness of the N-th lens unit LN is increased or the N-th lens unit LN is arranged close to the image plane position, the height of incidence of the off-axial ray passing through the (N−1)-th lens unit L(N−1) at the wide angle end is increased. Further, the lens effective diameter of the N-th lens unit LN is increased, and the zoom lens is disadvantageously increased in size.

Conditional Expression (6) defines a relationship of the focal length of the zoom lens at the telephoto end with respect to the interval between the intermediate lens unit LM and the (N−1)-th lens unit L(N−1) at the telephoto end. When the focal length of the zoom lens at the telephoto end is increased, the amount of movement during focusing tends to increase. Therefore, it is important to appropriately set the interval between the intermediate lens unit LM and the (N−1)-th lens unit L(N−1) in accordance with the focal length of the zoom lens at the telephoto end. When the ratio falls below the lower limit of Conditional Expression (6) and the interval is narrowed, it disadvantageously becomes difficult to focus the object from infinity to close distance at the telephoto end. When the ratio exceeds the upper limit of Conditional Expression (6) and the interval is increased, the total lens length is disadvantageously increased.

Conditional Expression (7) defines the imaging lateral magnification of the N-th lens unit LN at the telephoto end. When the imaging lateral magnification of the N-th lens unit LN is increased, the focus sensitivity of the (N−1)-th lens unit L(N−1) can be increased. Therefore, the amount of movement during focusing can be reduced, and the reduction is effective for downsizing the zoom lens.

Meanwhile, when the imaging lateral magnification is increased, the refractive power of the N-th lens unit LN is increased, and hence it becomes difficult to correct various aberrations. Therefore, it is important to set an appropriate imaging lateral magnification. When the value exceeds the upper limit of Conditional Expression (7) and the imaging lateral magnification of the N-th lens unit LN at the telephoto end is increased, the refractive power of the N-th lens unit LN becomes much stronger, and it disadvantageously becomes particularly difficult to correct the astigmatism and the curvature of field at the wide angle end. When the value falls below the lower limit of Conditional Expression (7) and the imaging lateral magnification of the N-th lens unit LN at the telephoto end is decreased, the amount of movement of the (N−1)-th lens unit L(N−1) during focusing becomes much larger, and the zoom lens is disadvantageously increased in size.

Conditional Expression (8) defines a ratio of the imaging lateral magnification of the N-th lens unit LN at the telephoto end to the imaging lateral magnification of the N-th lens unit LN at the wide angle end. The ratio of the imaging lateral magnifications can be interpreted as a magnification share of the N-th lens unit LN. When the ratio falls below the lower limit of Conditional Expression (8) and the magnification share of the N-th lens unit LN is decreased, it disadvantageously becomes difficult to increase the zoom ratio of the zoom lens. When the ratio exceeds the upper limit of Conditional Expression (8) and the magnification share of the N-th lens unit LN is increased, the amount of movement of the N-th lens unit LN during zooming is increased, and the mechanism becomes complicated. Further, it disadvantageously becomes difficult to ensure a predetermined amount of back focus at the wide angle end.

It is further preferred that numerical ranges of Conditional Expressions (2) to (8) satisfy the following values:

$$0.457 < fLM/f(N-1) < 0.953 \quad (2a);$$

$$3.271 < f1/fw < 5.246 \quad (3a);$$

$$0.438 < L(N-1)w/Lpw < 0.590 \quad (4a);$$

$$0.867 < DN/BFw < 1.659 \quad (5a);$$

$$0.028 < DLM(N-1)t/ft < 0.063 \quad (6a);$$

$$2.47 < \beta Nt < 3.89 \quad (7a); \text{ and}$$

$$1.43 < \beta 13Nt/\beta Nw < 1.71 \quad (8a).$$

In the zoom lens of each of Embodiments, the movement locus of the (N−1)-th lens unit L(N−1) is convex toward the object side with respect to the movement locus of the intermediate lens unit LM during zooming from the wide angle end to the telephoto end. In this manner, the variation in curvature of field is easily reduced in a zoom intermediate range. Further, the interval between the intermediate lens unit LM and the (N−1)-th lens unit L(N−1) is increased on the wide angle end side with respect to the zoom intermediate range so that the (N−1)-th lens unit L(N−1) having a positive refractive power is arranged on the image side. In this manner, the refractive power arrangement at the wide angle end becomes a retrofocus type, which is effective for obtaining wider angle of view.

Further, the interval between the intermediate lens unit LM and the (N−1)-th lens unit L(N−1) at the telephoto end with respect to the zoom intermediate range is increased. In this manner, a space in which the (N−1)-th lens unit L(N−1) for focusing moves is efficiently ensured, and the zoom lens is downsized. In the zoom lens of each of Embodiments, a lens unit configured not to move for zooming may be arranged on the image side of the N-th lens unit LN. Further, the intermediate lens unit LM may be divided into a plurality of lens units configured to move along different loci during zooming.

In this manner, the zoom ratio can be easily increased while the aberration variation during zooming is reduced. For example, in Embodiment 4, the intermediate lens unit LM is divided into the third lens unit L3 having a positive refractive power and the fourth lens unit L4 having a positive refractive power in the stated order from the object side to the image side, and the interval between both of the lens units is narrowed during zooming from the wide angle end to the telephoto end. In this manner, the fourth lens unit L4 contributes to magnification, and thus a high zoom ratio can be achieved while the compact zoom lens is maintained.

Further, in Embodiment 7, the intermediate lens unit LM is divided into the third lens unit L3 having a positive refractive power, the fourth lens unit L4 having a positive refractive power, and the fifth lens unit L5 having a positive refractive power in the stated order from the object side to the image side. Further, the interval between the third lens unit L3 and the fourth lens unit L4 is narrowed and the interval between the fourth lens unit L4 and the fifth lens unit L5 is increased during zooming from the wide angle end to the telephoto end.

The fourth lens unit L4 contributes to magnification, and thus a high zoom ratio can be achieved while the compact zoom lens is maintained. When the intermediate lens unit LM is divided into a plurality of lens units, a similar effect is obtained by satisfying Conditional Expression (1) assuming that the parameter fLM is a composite focal length of the intermediate lens unit LM at the wide angle end. Further, in Embodiment 1 to Embodiment 3 and Embodiment 6, the intermediate lens unit LM and the N-th lens unit LN are configured to move along the same movement locus during zooming so that the mechanism is simplified. Further, in Embodiment 7, the third lens unit L3 and the N-th lens unit LN are configured to move along the same movement locus during zooming so that the mechanism is simplified.

In the zoom lens of each of Embodiments, a part of lenses may be driven to have a component vertical to the optical axis direction so that image blur due to hand shake may be corrected. For example, the intermediate lens unit LM is close to the aperture stop SP and the height of incidence of the off-axial ray is low. Therefore, the lens diameter is small and the aberration variation during decentering can be easily suppressed. Therefore, a part of the lens units of the intermediate lens unit LM is preferred to serve as a lens unit for image blur correction. In Embodiment 4 and Embodiment 7, the fourth lens unit L4 is preferred to serve as the lens unit for image blur correction.

Next, an Embodiment of a digital still camera (image pickup apparatus) using the zoom lens as an image pickup optical system is described with reference to FIG. 23. In FIG. 23, a camera main body 10, and an image pickup optical system 11 formed of the zoom lens are illustrated. A solid-state image pickup element (photoelectric conversion element) 12, for example, a CCD sensor or a CMOS sensor is included in the camera main body, and is configured to receive an object image formed by the image pickup optical system 11.

The image pickup apparatus can be applied to an image pickup apparatus with a quick return mirror or an image pickup apparatus without a quick return mirror (mirrorless image pickup apparatus).

The zoom lenses according to Embodiments are described above, but needless to say, the present invention is not limited to those Embodiments, and various modifications and changes can be made thereto without departing from the gist of the present invention.

Numerical data 1 to 7 respectively corresponding to Embodiments 1 to 7 are shown below. In each of Numerical Embodiments, symbol i represents the order of a surface from the object side. In Numerical Embodiments, symbol ri represents a curvature radius of the i-th lens surface counted from the object side, symbol di represents a lens thickness or an air interval between the i-th surface and the (i+1)-th surface, and symbols ndi and vdi represent a refractive index and an Abbe number of a medium between the i-th surface and the (i+1)-th surface, respectively. Symbol BF represents a back focus. When an X axis is set in the optical axis direction, an H axis is set in a direction perpendicular to the optical axis, a travelling direction of light is defined as positive, a paraxial curvature radius is represented by R, and aspherical coefficients are represented by K, A2, A4, A6, A8, and A10, an aspherical shape is given by the following equation.

$$X = \frac{(1/R)}{1+\sqrt{1-(1+K)(H/R)^2}} + A_2H^2 + A_4H^4 + A_6H^6 + A_8H^8 + A_{10}H^{10}$$

In each of the aspherical coefficients, "e-x" means "$10^{-x}$". In addition to specifications such as the focal length and the F-number, a half angle of view and an image height of the zoom lens are the maximum image height that determines the half angle of view, and the total lens length is a distance from the first lens surface to the image plane. The back focus BF indicates a length from the last lens surface to the image plane. Moreover, each piece of lens unit data indicates a focal length of each lens unit.

In addition, the part in which an interval d of each optical surface is (variable) is changed during zooming, and an interval between surfaces corresponding to the focal length is shown in an annexed table. Results of calculations of the conditional expressions based on lens data in Embodiments 1 to 7 described below are shown in Table 1.

[Numerical Data 1]

| Surface data | | | | |
|---|---|---|---|---|
| Surface number i | ri | di | ndi | vdi |
| 1 | 82.949 | 1.50 | 1.95375 | 32.3 |
| 2 | 40.125 | 6.21 | 1.49700 | 81.5 |
| 3 | −1935.731 | 0.15 | | |
| 4 | 41.341 | 5.24 | 1.69680 | 55.5 |
| 5 | 436.661 | (Variable) | | |
| 6* | 101.568 | 1.40 | 1.83220 | 40.1 |
| 7 | 11.781 | 4.85 | | |
| 8 | −21.965 | 1.00 | 1.85150 | 40.8 |
| 9 | 48.725 | 0.15 | | |
| 10 | 29.706 | 4.05 | 1.89286 | 20.4 |
| 11 | −29.742 | 1.84 | | |
| 12 | −14.293 | 0.90 | 2.00100 | 29.1 |
| 13 | −21.848 | (Variable) | | |
| 14 (Stop) | ∞ | 1.43 | | |
| 15 | 25.200 | 2.25 | 1.78590 | 44.2 |
| 16 | −3904.289 | 0.15 | | |
| 17 | 21.349 | 3.25 | 1.56732 | 42.8 |
| 18 | −29.244 | 2.76 | 1.83481 | 42.7 |
| 19 | 27.607 | 1.20 | | |
| 20 | 18.943 | 1.00 | 1.76200 | 40.1 |
| 21 | 10.077 | 3.68 | 1.58313 | 59.4 |
| 22* | −58.581 | 1.20 | | |
| 23 | −74.994 | 1.00 | 1.67270 | 32.1 |
| 24 | 13.177 | 3.06 | 1.51633 | 64.1 |
| 25 | −37.514 | (Variable) | | |
| 26* | 17.133 | 3.09 | 1.49710 | 81.6 |
| 27* | −146.090 | (Variable) | | |
| 28 | 66.563 | 0.70 | 1.73400 | 51.5 |
| 29 | 15.005 | 2.64 | | |
| 30 | −25.623 | 6.96 | 1.59270 | 35.3 |
| 31 | −10.494 | 0.80 | 1.77250 | 49.6 |
| 32 | −47.544 | 1.46 | | |
| 33 | 34.057 | 3.88 | 1.59270 | 35.3 |
| 34 | 5,115.655 | (Variable) | | |
| Image plane | ∞ | | | |

| Aspherical surface data |
|---|
| Sixth surface |

K = 0.00000e+000   A4 = 1.30977e−005   A6 = −5.30938e−009
A8 = −2.45739e−011   A10 = 1.17511e−012
Twenty-second surface K = 0.00000e+000   A4 = 1.78497e−005   A6 = −1.01999e−007
A8 = −1.81859e−009   A10 = 1.654196−011
Twenty-sixth surface K = 0.00000e+000   A4 = −2.22346e−005   A6 = −1.19993e−007
A8 = −6.66118e−009   A10 = −5.66229e−011
Twenty-seventh surface -continued

| K = 0.00000e+000 | A4 = 1.30320e−005 | A6 = −1.18034e−007 |
| A8 = −8.61985e−009 | A10 = −3.27262e−011 | |

Various data
Zoom ratio 7.07

| | Wide angle | Intermediate | Telephoto |
|---|---|---|---|
| Focal length | 18.52 | 48.97 | 130.97 |
| F-number | 3.61 | 4.90 | 5.88 |
| Half angle of view (degrees) | 36.41 | 15.59 | 5.95 |
| Image height | 13.66 | 13.66 | 13.66 |
| Total lens length | 103.66 | 122.12 | 146.89 |
| BF | 10.98 | 25.64 | 38.43 |
| d5 | 0.89 | 16.23 | 33.07 |
| d13 | 17.41 | 5.85 | 1.00 |
| d25 | 4.26 | 2.67 | 5.38 |
| d27 | 2.32 | 3.90 | 1.20 |
| d34 | 10.98 | 25.64 | 38.43 |

Zoom lens unit data

| Unit | First surface | Focal length |
|---|---|---|
| 1 | 1 | 63.84 |
| 2 | 6 | −11.89 |
| 3 | 14 | 22.69 |
| (N − 1) | 26 | 31.04 |
| N | 28 | −26.58 |

[Numerical Data 2]

Surface data

| Surface number i | ri | di | ndi | vdi |
|---|---|---|---|---|
| 1 | 98.939 | 1.50 | 1.95375 | 32.3 |
| 2 | 46.353 | 6.35 | 1.49700 | 81.5 |
| 3 | −551.560 | 0.15 | | |
| 4 | 43.233 | 5.25 | 1.67790 | 55.3 |
| 5 | 262.773 | (Variable) | | |
| 6* | 121.432 | 1.40 | 1.83220 | 40.1 |
| 7 | 12.254 | 5.23 | | |
| 8 | −22.152 | 1.00 | 1.80400 | 46.6 |
| 9 | 44.415 | 0.15 | | |
| 10 | 28.967 | 4.49 | 1.85478 | 24.8 |
| 11 | −26.212 | 1.67 | | |
| 12 | −14.622 | 0.90 | 1.85150 | 40.8 |
| 13 | −24.092 | (Variable) | | |
| 14 (Stop) | ∞ | 1.00 | | |
| 15* | 16.202 | 3.63 | 1.58313 | 59.4 |
| 16* | −54.661 | 4.17 | | |
| 17 | 75.897 | 0.80 | 1.71300 | 53.9 |
| 18 | 19.749 | 1.37 | | |
| 19* | 26.914 | 3.26 | 1.58313 | 59.4 |
| 20 | −16.128 | 0.80 | 1.72047 | 34.7 |
| 21 | −36.429 | 1.20 | | |
| 22 | −80.390 | 0.80 | 1.91082 | 35.3 |
| 23 | 16.013 | 3.46 | 1.51823 | 58.9 |
| 24 | −17.976 | (Variable) | | |
| 25 | 16.502 | 2.74 | 1.49700 | 81.5 |
| 26 | 47.769 | (Variable) | | |
| 27 | 40.684 | 1.00 | 1.76802 | 49.2 |
| 28* | 14.030 | 3.41 | | |
| 29 | −29.288 | 3.38 | 1.64769 | 33.8 |
| 30 | −12.345 | 0.80 | 1.77250 | 49.6 |
| 31 | −71.547 | 0.22 | | |
| 32 | 30.475 | 3.80 | 1.59270 | 35.3 |
| 33 | −27,143.757 | (Variable) | | |
| Image plane | ∞ | | | |

-continued

Aspherical surface data

Sixth surface

| K = 0.00000e+000 | A4 = 1.56125e−005 | A6 = −1.46077e−008 |
| A8 = −1.59750e−011 | A10 = 1.28902e−012 | |

Fifteenth surface

| K = −1.67650e+000 | A4 = 2.51019e−005 | A6 = −6.26491e−009 |
| A8 = 2.85233e−009 | A10 = −4.01479e−012 | |

Sixteenth surface

| K = 0.00000e+000 | A4 = 2.33556e−005 | A6 = 4.78258e−008 |
| A8 = 2.75332e−009 | A10 = −9.18626e−012 | |

Nineteenth surface

| K = 0.00000e+000 | A4 = −1.85100e−005 | A6 = 6.63887e−008 |
| A8 = 4.47635e−010 | A10 = −2.00277e−011 | |

Twenty-eighth surface

| K = 0.00000e+000 | A4 = −5.66498e−006 | A6 = −6.09170e−008 |
| A8 = −6.80892e−010 | A10 = 1.28188e−011 | |

Various data
Zoom ratio 7.08

| | Wide angle | Intermediate | Telephoto |
|---|---|---|---|
| Focal length | 18.51 | 49.01 | 130.98 |
| F-number | 3.59 | 4.82 | 5.88 |
| Half angle of view (degrees) | 36.43 | 15.57 | 5.95 |
| Image height | 13.66 | 13.66 | 13.66 |
| Total lens length | 104.31 | 122.72 | 148.15 |
| BF | 10.99 | 24.52 | 36.57 |
| d5 | 0.90 | 18.66 | 37.59 |
| d13 | 19.43 | 6.56 | 1.00 |
| d24 | 6.96 | 4.24 | 7.88 |
| d26 | 2.12 | 4.84 | 1.20 |
| d33 | 10.99 | 24.52 | 36.57 |

Zoom lens unit data

| Unit | First surface | Focal length |
|---|---|---|
| 1 | 1 | 71.97 |
| 2 | 6 | −13.24 |
| 3 | 14 | 23.67 |
| (N − 1) | 25 | 49.29 |
| N | 27 | −29.64 |

[Numerical Data 3]

Surface data

| Surface number i | ri | di | ndi | vdi |
|---|---|---|---|---|
| 1 | 100.470 | 1.50 | 1.95375 | 32.3 |
| 2 | 44.988 | 6.46 | 1.49700 | 81.5 |
| 3 | −394.474 | 0.15 | | |
| 4 | 42.255 | 5.33 | 1.69680 | 55.5 |
| 5 | 309.974 | (Variable) | | |
| 6* | 167.105 | 1.40 | 1.83220 | 40.1 |
| 7 | 12.387 | 5.28 | | |
| 8 | −19.980 | 1.00 | 1.91082 | 35.3 |
| 9 | 84.233 | 0.15 | | |
| 10 | 37.035 | 4.53 | 1.89286 | 20.4 |
| 11 | −22.741 | 1.65 | | |
| 12 | −14.585 | 0.90 | 2.00100 | 29.1 |
| 13 | −22.893 | (Variable) | | |
| 14* | 26.286 | 2.29 | 1.58313 | 59.4 |
| 15* | 852.907 | 2.15 | | |
| 16 (Stop) | ∞ | 1.35 | | |
| 17 | 19.531 | 8.63 | 1.57099 | 50.8 |
| 18 | −86.468 | 0.80 | 1.91082 | 35.3 |
| 19 | 24.707 | 1.20 | | |
| 20 | 16.065 | 1.00 | 1.84666 | 23.9 |

-continued

| | | | | |
|---|---|---|---|---|
| 21 | 10.861 | 3.61 | 1.58313 | 59.4 |
| 22* | −48.371 | (Variable) | | |
| 23* | 17.529 | 2.36 | 1.49710 | 81.6 |
| 24 | 563.712 | (Variable) | | |
| 25 | 37.745 | 0.70 | 1.80400 | 46.6 |
| 26 | 12.672 | 3.87 | | |
| 27 | −18.981 | 4.21 | 1.59270 | 35.3 |
| 28 | −8.481 | 0.80 | 1.77250 | 49.6 |
| 29 | −35.114 | 0.15 | | |
| 30 | 31.177 | 5.32 | 1.59270 | 35.3 |
| 31 | −29.290 | 0.90 | 1.91082 | 35.3 |
| 32 | −89.126 | (Variable) | | |
| Image plane | ∞ | | | |

Aspherical surface data

Sixth surface

K = 0.00000e+000  A4 = 1.48583e−005  A6 = −2.61475e−008
A8 = 2.16828e−010  A10 = 2.78779e−013

Fourteenth surface

K = 0.00000e+000  A4 = −3.17509e−007  A6 = 1.88412e−007
A8 = −2.68426e−009  A10 = 1.49908e−011

Fifteenth surface

K = 0.00000e+000  A4 = 1.06856e−005  A6 = 2.10923e−007
A8 = −3.15590e−009  A10 = 1.775186−011

Twenty-second surface

K = 0.00000e+000  A4 = 3.16443e−005  A6 = 1.86714e−007
A8 = −7.26255e−009  A10 = 7.76031e−011

Twenty-third surface

K = 0.00000e+000  A4 = −2.76218e−005  A6 = 1.71253e−007
A8 = −1.56065e−008  A10 = 1.81299e−010

Various data
Zoom ratio 7.07

| | Wide angle | Intermediate | Telephoto |
|---|---|---|---|
| Focal length | 18.52 | 49.19 | 130.97 |
| F-number | 3.40 | 4.74 | 5.88 |
| Half angle of view (degrees) | 36.42 | 15.52 | 5.95 |
| Image height | 13.66 | 13.66 | 13.66 |
| Total lens length | 103.61 | 121.85 | 146.78 |
| BF | 10.93 | 25.03 | 37.77 |
| d5 | 0.89 | 16.95 | 34.25 |
| d13 | 18.03 | 6.11 | 1.00 |
| d22 | 3.81 | 2.56 | 4.87 |
| d24 | 2.26 | 3.51 | 1.20 |
| d32 | 10.93 | 25.03 | 37.77 |

Zoom lens unit data

| Unit | First surface | Focal length |
|---|---|---|
| 1 | 1 | 66.84 |
| 2 | 6 | −12.81 |
| 3 | 14 | 21.97 |
| (N − 1) | 23 | 36.34 |
| N | 25 | −20.31 |

[Numerical Data 4]

Surface data

| Surface number i | ri | di | ndi | vdi |
|---|---|---|---|---|
| 1 | 78.949 | 1.50 | 1.95375 | 32.3 |
| 2 | 50.903 | 7.17 | 1.49700 | 81.5 |
| 3 | −620.866 | 0.15 | | |
| 4 | 46.738 | 5.70 | 1.49700 | 81.5 |
| 5 | 236.016 | (Variable) | | |
| 6* | 105.709 | 1.40 | 1.83220 | 40.1 |
| 7 | 12.251 | 4.69 | | |
| 8 | −29.774 | 0.90 | 1.91082 | 35.3 |
| 9 | 37.940 | 0.15 | | |
| 10 | 26.634 | 4.79 | 1.89286 | 20.4 |
| 11 | −36.784 | 1.13 | | |
| 12* | −17.526 | 0.90 | 1.83220 | 40.1 |
| 13 | −30.108 | (Variable) | | |
| 14 (Stop) | ∞ | 1.00 | | |
| 15 | 32.905 | 2.27 | 1.84666 | 23.9 |
| 16 | 777.503 | 3.11 | | |
| 17 | 28.334 | 5.63 | 1.48749 | 70.2 |
| 18 | −28.058 | 3.42 | 2.00069 | 25.5 |
| 19 | 73.118 | (Variable) | | |
| 20 | 19.291 | 0.80 | 1.76200 | 40.1 |
| 21 | 10.857 | 4.30 | 1.58313 | 59.4 |
| 22* | −37.578 | (Variable) | | |
| 23* | 25.814 | 2.86 | 1.49710 | 81.6 |
| 24 | −90.644 | (Variable) | | |
| 25 | 36.367 | 0.80 | 1.90366 | 31.3 |
| 26 | 13.288 | 2.67 | | |
| 27 | −43.322 | 5.31 | 1.75211 | 25.1 |
| 28 | −9.967 | 0.80 | 1.85135 | 40.1 |
| 29 | −109.873 | 3.67 | | |
| 30 | 28.509 | 6.97 | 1.59270 | 35.3 |
| 31 | −36.033 | 1.00 | 1.80610 | 33.3 |
| 32 | 1,368.702 | (Variable) | | |
| Image plane | ∞ | | | |

Aspherical surface data

Sixth surface

K = 0.00000e+000  A4 = 9.14513e−006  A6 = −7.38095e−009
A8 = −3.14416e−011  A10 = 7.39203e−013

Twelfth surface

K = 0.00000e+000  A4 = −2.35381e−006  A6 = −9.69249e−009
A8 = −4.92156e−010  A10 = 3.34040e−012

Twenty-second surface

K = 0.00000e+000  A4 = 2.25602e−005  A6 = −3.52908e−009
A8 = −2.79217e−009  A10 = 2.25558e−011

Twenty-third surface

K = 0.00000e+000  A4 = −2.10517e−005  A6 = 1.04625e−007
A8 = −6.00169e−009  A10 = 6.71029e−011

Various data
Zoom ratio 10.48

| | Wide angle | Intermediate | Telephoto |
|---|---|---|---|
| Focal length | 18.51 | 59.64 | 193.98 |
| F-number | 3.73 | 5.46 | 6.50 |
| Half angle of view (degrees) | 36.43 | 12.90 | 4.03 |
| Image height | 13.66 | 13.66 | 13.66 |
| Total lens length | 119.95 | 145.65 | 176.37 |
| BF | 13.43 | 31.04 | 44.18 |
| d5 | 0.90 | 24.06 | 47.27 |
| d13 | 22.74 | 7.67 | 2.04 |
| d19 | 3.02 | 1.56 | 1.12 |
| d22 | 3.90 | 3.56 | 7.39 |
| d24 | 2.86 | 4.66 | 1.26 |
| d32 | 13.43 | 31.04 | 44.18 |

Zoom lens unit data

| Unit | First surface | Focal length |
|---|---|---|
| 1 | 1 | 80.64 |
| 2 | 6 | −12.84 |
| 3 | 14 | 58.94 |
| 4 | 20 | 28.61 |
| (N − 1) | 23 | 40.75 |
| N | 25 | −23.32 |
| Intermediate lens unit LM | 14 | 24.74 |

[Numerical Data 5]

Surface data

| Surface number i | ri | di | ndi | vdi |
|---|---|---|---|---|
| 1 | 88.536 | 1.50 | 1.95375 | 32.3 |
| 2 | 57.884 | 7.39 | 1.49700 | 81.5 |
| 3 | −785.126 | 0.15 | | |
| 4 | 53.245 | 5.85 | 1.49700 | 81.5 |
| 5 | 254.799 | (Variable) | | |
| 6* | 103.381 | 1.40 | 1.83220 | 40.1 |
| 7 | 13.852 | 5.94 | | |
| 8 | −25.557 | 1.00 | 1.83481 | 42.7 |
| 9 | 59.687 | 0.15 | | |
| 10 | 33.564 | 4.76 | 1.80809 | 22.8 |
| 11 | −30.301 | 1.59 | | |
| 12 | −16.774 | 0.90 | 1.83481 | 42.7 |
| 13 | −28.847 | (Variable) | | |
| 14* | 17.522 | 3.00 | 1.58313 | 59.4 |
| 15* | −261.456 | 1.00 | | |
| 16 (Stop) | ∞ | 3.74 | | |
| 17 | 70.206 | 1.95 | 1.65160 | 58.5 |
| 18 | 22.002 | 1.84 | | |
| 19* | 23.403 | 3.60 | 1.58313 | 59.4 |
| 20 | −17.070 | 0.86 | 1.78472 | 25.7 |
| 21 | −28.261 | 1.20 | | |
| 22 | −71.939 | 0.80 | 1.83481 | 42.7 |
| 23 | 13.892 | 4.15 | 1.51742 | 52.4 |
| 24 | −50.567 | (Variable) | | |
| 25 | 20.349 | 1.00 | 1.78472 | 25.7 |
| 26 | 14.736 | 3.20 | 1.69680 | 55.5 |
| 27 | 334.260 | (Variable) | | |
| 28 | 19.815 | 0.80 | 1.72000 | 50.2 |
| 29* | 11.529 | 7.66 | | |
| 30 | −38.970 | 3.88 | 1.67270 | 32.1 |
| 31 | −12.216 | 0.80 | 1.81600 | 46.6 |
| 32 | −168.935 | 0.15 | | |
| 33 | 32.156 | 4.03 | 1.59270 | 35.3 |
| 34 | 177.235 | (Variable) | | |
| Image plane | ∞ | | | |

Aspherical surface data

Sixth surface

K = 0.00000e+000  A4 = 8.78644e−006  A6 = 1.05152e−008
A8 = −1.14430e−010  A10 = 7.85577e−013

Fourteenth surface

K = −1.67650e+000  A4 = 2.40641e−005  A6 = −1.75453e−008
A8 = 2.04022e−009  A10 = −1.08825e−011

Fifteenth surface

K = 0.00000e+000  A4 = 6.89463e−006  A6 = 3.40018e−008
A8 = 1.89575e−009  A10 = −1.36559e−011

Nineteenth surface

K = 0.00000e+000  A4 = −2.54904e−005  A6 = 5.03830e−008
A8 = −5.69915e−010  A10 = −1.60179e−012

Twenty-ninth surface

K = 0.00000e+000  A4 = −2.04091e−005  A6 = −7.25882e−008
A8 = −2.97304e−009  A10 = 1.76166e−011

Various data
Zoom ratio 10.48

| | Wide angle | Intermediate | Telephoto |
|---|---|---|---|
| Focal length | 18.51 | 59.97 | 193.99 |
| F-number | 3.52 | 5.14 | 6.45 |
| Half angle of view (degrees) | 36.43 | 12.83 | 4.03 |
| Image height | 13.66 | 13.66 | 13.66 |
| Total lens length | 115.66 | 144.95 | 181.92 |
| BF | 11.33 | 25.27 | 41.74 |
| d5 | 0.90 | 27.72 | 53.40 |
| d13 | 23.85 | 7.38 | 1.00 |
| d24 | 3.24 | 5.21 | 10.29 |
| d27 | 2.05 | 5.09 | 1.20 |
| d34 | 11.33 | 25.27 | 41.74 |

Zoom lens unit data

| Unit | First surface | Focal length |
|---|---|---|
| 1 | 1 | 91.97 |
| 2 | 6 | −14.20 |
| 3 | 14 | 29.44 |
| (N − 1) | 25 | 32.45 |
| N | 28 | −29.02 |

[Numerical Data 6]

Surface data

| Surface number i | ri | di | ndi | vdi |
|---|---|---|---|---|
| 1 | 80.919 | 1.50 | 1.95375 | 32.3 |
| 2 | 39.536 | 6.19 | 1.49700 | 81.5 |
| 3 | −4371.474 | 0.15 | | |
| 4 | 40.946 | 5.23 | 1.69680 | 55.5 |
| 5 | 415.882 | (Variable) | | |
| 6* | 97.524 | 1.40 | 1.83220 | 40.1 |
| 7 | 11.670 | 4.88 | | |
| 8 | −20.888 | 1.00 | 1.85150 | 40.8 |
| 9 | 51.468 | 0.15 | | |
| 10 | 30.480 | 4.07 | 1.89286 | 20.4 |
| 11 | −27.298 | 1.75 | | |
| 12 | −14.088 | 0.90 | 2.00100 | 29.1 |
| 13 | −22.558 | (Variable) | | |
| 14 (Stop) | ∞ | 1.45 | | |
| 15 | 24.541 | 2.34 | 1.78590 | 44.2 |
| 16 | −462.815 | 0.15 | | |
| 17 | 21.055 | 3.27 | 1.56732 | 42.8 |
| 18 | −29.997 | 1.69 | 1.83481 | 42.7 |
| 19 | 27.468 | 1.20 | | |
| 20 | 19.110 | 1.00 | 1.76200 | 40.1 |
| 21 | 10.039 | 4.17 | 1.58313 | 59.4 |
| 22* | −57.560 | 1.20 | | |
| 23 | −69.447 | 1.00 | 1.67270 | 32.1 |
| 24 | 12.421 | 3.05 | 1.51633 | 64.1 |
| 25 | −45.048 | (Variable) | | |
| 26* | 16.484 | 3.18 | 1.49710 | 81.6 |
| 27* | −89.850 | (Variable) | | |
| 28 | 85.274 | 0.70 | 1.73400 | 51.5 |
| 29 | 14.726 | 2.75 | | |
| 30 | −27.473 | 6.10 | 1.59270 | 35.3 |
| 31 | −10.788 | 0.80 | 1.77250 | 49.6 |
| 32 | −54.923 | 1.15 | | |
| 33 | 35.645 | 3.98 | 1.59270 | 35.3 |
| 34 | −178.719 | (Variable) | | |
| Image plane | ∞ | | | |

Aspherical surface data

Sixth surface

K = 0.00000e+000  A4 = 1.51950e−005  A6 = −7.93371e−009
A8 = −2.15457e−011  A10 = 1.53632e−012

Twenty-second surface

K = 0.00000e+000  A4 = 1.73868e−005  A6 = −1.12100e−007
A8 = −1.45283e−009  A10 = 1.132796e−011

Twenty-sixth surface

K = 0.00000e+000  A4 = −2.43220e−005  A6 = 1.79012e−008
A8 = −9.65365e−009  A10 = −3.75584e−011

Twenty-seventh surface

K = 0.00000e+000  A4 = 2.11717e−005  A6 = −1.85645e−008
A8 = −1.07067e−008  A10 = −2.36482e−011

-continued

| Various data Zoom ratio 7.07 | | | |
|---|---|---|---|
| | Wide angle | Intermediate | Telephoto |
| Focal length | 18.52 | 48.85 | 130.96 |
| F-number | 3.65 | 4.92 | 5.88 |
| Half angle of view (degrees) | 36.41 | 15.62 | 5.95 |
| Image height | 13.66 | 13.66 | 13.66 |
| Total lens length | 103.58 | 122.24 | 146.75 |
| BF | 12.62 | 27.62 | 40.18 |
| d5 | 0.88 | 16.03 | 32.92 |
| d13 | 17.43 | 5.94 | 1.00 |
| d25 | 4.60 | 2.88 | 5.05 |
| d27 | 1.65 | 3.36 | 1.20 |
| d34 | 12.62 | 27.62 | 40.18 |

| Zoom lens unit data | | |
|---|---|---|
| Unit | First surface | Focal length |
| 1 | 1 | 63.61 |
| 2 | 6 | −11.56 |
| 3 | 14 | 22.41 |
| (N − 1) | 26 | 28.30 |
| N | 28 | −26.20 |

[Numerical Data 7]

| Surface data | | | | |
|---|---|---|---|---|
| Surface number i | ri | di | ndi | vdi |
| 1 | ∞ | 1.50 | | |
| 2 | 86.487 | 1.60 | 1.95375 | 32.3 |
| 3 | 45.458 | 6.82 | 1.49700 | 81.5 |
| 4 | 428.156 | 0.15 | | |
| 5 | 49.811 | 5.59 | 1.69680 | 55.5 |
| 6 | 527.493 | (Variable) | | |
| 7 | 79.128 | 1.00 | 2.00100 | 29.1 |
| 8 | 12.802 | 4.66 | | |
| 9 | −38.413 | 0.80 | 1.91082 | 35.3 |
| 10 | 37.020 | 0.25 | | |
| 11 | 25.973 | 4.72 | 1.89286 | 20.4 |
| 12 | −26.884 | 0.70 | | |
| 13 | −20.188 | 1.00 | 1.91082 | 35.3 |
| 14 | −66.336 | (Variable) | | |
| 15 (Stop) | ∞ | 1.74 | | |
| 16* | 22.321 | 2.11 | 1.68893 | 31.2 |
| 17 | 817.402 | 0.15 | | |
| 18 | 20.916 | 3.09 | 1.57501 | 41.5 |
| 19 | −21.606 | 0.80 | 1.77250 | 49.6 |
| 20 | 26.440 | (Variable) | | |
| 21 | 23.697 | 1.00 | 1.78472 | 25.7 |
| 22 | 12.718 | 3.08 | 1.58313 | 59.4 |
| 23* | −40.000 | (Variable) | | |
| 24 | −41.886 | 1.00 | 1.74077 | 27.8 |
| 25 | 14.194 | 3.14 | 1.65844 | 50.9 |
| 26 | −29.112 | (Variable) | | |
| 27* | 14.820 | 3.12 | 1.49710 | 81.6 |
| 28* | −99.890 | (Variable) | | |
| 29 | 35.562 | 0.70 | 1.83400 | 37.2 |
| 30 | 11.856 | 2.47 | | |
| 31 | −34.612 | 4.60 | 1.59270 | 35.3 |
| 32 | −9.130 | 0.80 | 1.77250 | 49.6 |
| 33 | 287.830 | 0.15 | | |
| 34 | 39.508 | 2.90 | 1.89286 | 20.4 |
| 35 | 3,118.991 | (Variable) | | |
| Image plane | ∞ | | | |

| Aspherical surface data |
|---|
| Sixteenth surface |
| K = 0.00000e+000   A4 = −2.99366e−006   A6 = −6.88496e−008 |
| A8 = 2.38004e−009   A10 = −2.25075e−011 |
| Twenty-third surface |
| K = 0.00000e+000   A4 = 1.75913e−005   A6 = −4.44467e−008 |
| A8 = −2.41602e−010   A10 = 8.89749e−012 |
| Twenty-seventh surface |
| K = 0.00000e+000   A4 = −2.72887e−005   A6 = −4.11248e−008 |
| A8 = −5.93343e−009   A10 = −1.30173e−010 |
| Twenty-eighth surface |
| K = 0.00000e+000   A4 = 2.13547e−005   A6 = 4.28197e−008 |
| A8 = −1.10930e−008   A10 = −6.22477e−011 |

| Various data Zoom ratio 8.45 | | | |
|---|---|---|---|
| | Wide angle | Intermediate | Telephoto |
| Focal length | 15.51 | 45.00 | 130.98 |
| F-number | 3.68 | 5.03 | 6.50 |
| Half angle of view (degrees) | 39.97 | 16.89 | 5.95 |
| Image height | 13.00 | 13.66 | 13.66 |
| Total lens length | 103.77 | 122.35 | 149.68 |
| BF | 12.76 | 23.92 | 35.17 |
| d6 | 0.80 | 22.02 | 43.58 |
| d14 | 20.44 | 6.65 | 1.17 |
| d20 | 3.87 | 2.15 | 1.20 |
| d23 | 1.20 | 2.92 | 3.87 |
| d26 | 3.86 | 2.71 | 3.85 |
| d28 | 1.20 | 2.35 | 1.20 |
| d35 | 12.76 | 23.92 | 35.17 |

| Zoom lens unit data | | |
|---|---|---|
| Unit | First surface | Focal length |
| 1 | 1 | 80.14 |
| 2 | 7 | −12.71 |
| 3 | 15 | 40.74 |
| 4 | 21 | 31.88 |
| 5 | 24 | 3215.18 |
| (N − 1) | 27 | 26.20 |
| N | 29 | −15.58 |
| Intermediate lens unit LM | 15 | |

TABLE 1

| Conditional Expressions | | | | | | | | |
|---|---|---|---|---|---|---|---|---|
| | (1) $(fN/fLM) \times (fN/f(N-1))$ | (2) $fLM/ f(N-1)$ | (3) $f1/ fw$ | (4) $L(N-1)w/Lpw$ | (5) $DN/ BFw$ | (6) $DLM(N-1)t/ft$ | (7) $\beta Nt$ | (8) $\beta Nt/ \beta Nw$ |
| Embodiment 1 | 1.003 | 0.731 | 3.447 | 0.512 | 1.497 | 0.041 | 3.04 | 1.51 |
| Embodiment 2 | 0.753 | 0.480 | 3.888 | 0.460 | 1.148 | 0.060 | 2.59 | 1.50 |
| Embodiment 3 | 0.517 | 0.605 | 3.609 | 0.562 | 1.459 | 0.037 | 3.47 | 1.61 |
| Embodiment 4 | 0.540 | 0.607 | 4.357 | 0.553 | 1.580 | 0.038 | 3.61 | 1.57 |
| Embodiment 5 | 0.881 | 0.907 | 4.969 | 0.545 | 1.528 | 0.053 | 2.83 | 1.59 |

TABLE 1-continued

| | Conditional Expressions | | | | | | | |
|---|---|---|---|---|---|---|---|---|
| | (1) (fN/fLM) × (fN/f(N − 1)) | (2) fLM/ f(N − 1) | (3) f1/ fw | (4) L(N − 1) w/Lpw | (5) DN/ BFw | (6) DLM(N − 1) t/ft | (7) βNt | (8) βNt/ βNw |
| Embodiment 6 | 1.083 | 0.792 | 3.434 | 0.513 | 1.227 | 0.039 | 3.12 | 1.51 |
| Embodiment 7 | 0.412 | 0.859 | 5.168 | 0.476 | 0.911 | 0.029 | 3.70 | 1.63 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-070480, filed Mar. 31, 2017, which is hereby incorporated by reference herein in its entirety.

What is claimed is:

1. A zoom lens, comprising, in order from an object side to an image side:
a first lens unit having a positive refractive power;
a second lens unit having a negative refractive power;
an intermediate lens unit including at least one lens unit;
an (N−1)-th lens unit having a positive refractive power; and
an N-th lens unit having a negative refractive power,
the first lens unit, the second lens unit, the intermediate lens unit, the (N−1)-th lens unit, and the N-th lens unit having an interval between each pair of adjacent lens units, which is changed during zooming,
wherein the (N−1)-th lens unit is configured to move for focusing,
wherein the (N−1)-th lens unit consists of a single lens element, and
wherein the zoom lens satisfies the following conditional expressions:

$0.4 < (fN/fLM) \times (fN/f(N-1)) < 1.1$; and $0.759 < DN/BFw < 1.896$, where fLM represents a focal length of the intermediate lens unit at a wide angle end, f(N−1) represents a focal length of the (N−1)-th lens unit, fN represents a focal length of the N-th lens unit, DN represents a distance on an optical axis from a lens surface closest to the object side of the N-th lens unit to a lens surface closest to the image side of the N-th lens unit, and BFw represents a back focus at the wide angle end.

2. A zoom lens according to claim 1, wherein the (N−1)-th lens unit consists of a single lens.

3. A zoom lens according to claim 1, wherein the zoom lens satisfies the following conditional expression:

$0.400 < fLM/f(N-1) < 1.089$.

4. A zoom lens according to claim 1, wherein the zoom lens satisfies the following conditional expression:

$1.862 < f1/fw < 6.201$, where f1 represents a focal length of the first lens unit, and fw represents a focal length of the zoom lens at the wide angle end.

5. A zoom lens according to claim 1, further comprising an aperture stop on the image side of the second lens unit, wherein the zoom lens satisfies the following conditional expression:

$0.383 < L(N-1)w/Lpw < 0.674$, where L(N−1)w represents a distance on the optical axis from a lens surface closest to the object side of the (N−1)-th lens unit to an image plane at the wide angle end, and Lpw represents a distance on the optical axis from the aperture stop to the image plane at the wide angle end.

6. A zoom lens according to claim 1, wherein the zoom lens satisfies the following conditional expression:

$0.025 < DLM(N-1)t/ft < 0.072$, where DLM(N−1)t represents a distance on the optical axis from a lens surface closest to the image side of the intermediate lens unit to a lens surface closest to the object side of the (N−1)-th lens unit at a telephoto end, and ft represents a focal length of the zoom lens at the telephoto end.

7. A zoom lens according to claim 1, wherein the zoom lens satisfies the following conditional expression:

$2.16 < \beta Nt < 4.44$, where βNt represents an imaging lateral magnification of the N-th lens unit at a telephoto end.

8. A zoom lens according to claim 1, wherein the zoom lens satisfies the following conditional expression:

$1.25 < \beta Nt/\beta Nw < 1.96$, where βNt represents an imaging lateral magnification of the N-th lens unit at a telephoto end, and βNw represents an imaging lateral magnification of the N-th lens unit at the wide angle end.

9. A zoom lens according to claim 1, wherein the intermediate lens unit consists of a third lens unit having a positive refractive power.

10. A zoom lens according to claim 1, wherein the intermediate lens unit consists of, in order from the object side to the image side:
a third lens unit having a positive refractive power; and
a fourth lens unit having a positive refractive power.

11. A zoom lens according to claim 1, wherein the intermediate lens unit consists of, in order from the object side to the image side:
a third lens unit having a positive refractive power;
a fourth lens unit having a positive refractive power; and
a fifth lens unit having a positive refractive power.

12. A zoom lens according to claim 1, wherein the (N−1)-th lens unit is configured to move toward the object side during focusing from infinity to close distance.

13. An image pickup apparatus, comprising:
a zoom lens; and
an image pickup element configured to receive an image formed by the zoom lens,
wherein the zoom lens includes, in order from an object side to an image side:
a first lens unit having a positive refractive power;
a second lens unit having a negative refractive power;
an intermediate lens unit including at least one lens unit;

an (N−1)-th lens unit having a positive refractive power; and an N-th lens unit having a negative refractive power, the first lens unit, the second lens unit, the intermediate lens unit, the (N−1)-th lens unit, and the N-th lens unit having an interval between each pair of adjacent lens units, which is changed during zooming, wherein the (N−1)-th lens unit is configured to move for focusing, wherein the (N−1)-th lens unit consists of a single lens element, and wherein the zoom lens satisfies the following conditional expressions:

$0.4 < (fN/fLM) \times (fN/f(N-1)) < 1.1$; and $0.759 < DN/BFw < 1.896$, where fLM represents a focal length of the intermediate lens unit at a wide angle end, f(N−1) represents a focal length of the (N−1)-th lens unit, fN represents a focal length of the N-th lens unit, DN represents a distance on an optical axis from a lens surface closest to the object side of the N-th lens unit to a lens surface closest to the image side of the N-th lens unit, and BFw represents a back focus at the wide angle end.

* * * * *